(12) United States Patent
Burger et al.

(10) Patent No.: US 10,132,531 B2
(45) Date of Patent: Nov. 20, 2018

(54) METHOD FOR OPERATING AN ADSORPTION COMPRESSOR AND ADSORPTION COMPRESSOR FOR USE IN SAID METHOD

(75) Inventors: Johannes Faas Burger, Enschede (NL); Robert Jan Meijer, Enschede (NL)

(73) Assignee: Cooll Sustainable Energy Solution B.V., Enschede (NL)

(*) Notice: Subject to any disclaimer, the term of this patent is extended or adjusted under 35 U.S.C. 154(b) by 1140 days.

(21) Appl. No.: 14/000,894

(22) PCT Filed: Feb. 22, 2012

(86) PCT No.: PCT/NL2012/050105
§ 371 (c)(1),
(2), (4) Date: Dec. 19, 2013

(87) PCT Pub. No.: WO2012/115513
PCT Pub. Date: Aug. 30, 2012

(65) Prior Publication Data
US 2014/0116073 A1 May 1, 2014

(30) Foreign Application Priority Data

Feb. 22, 2011 (NL) .................................... 2006277

(51) Int. Cl.
*F25B 17/00* (2006.01)
*F25B 15/00* (2006.01)
(Continued)

(52) U.S. Cl.
CPC ............ *F25B 15/00* (2013.01); *F25B 17/083* (2013.01); *F25B 25/02* (2013.01); *F25B 35/04* (2013.01);
(Continued)

(58) Field of Classification Search
CPC .......... F25B 15/00; F25B 25/02; F25B 35/04; F25B 17/083; F25B 2500/01
See application file for complete search history.

(56) References Cited

U.S. PATENT DOCUMENTS 3,950,154 A * 4/1976 Henderson ........... B01D 53/261
96/126
4,610,148 A 9/1986 Shelton
(Continued)

FOREIGN PATENT DOCUMENTS

DE 3700707 7/1988
DE 19645475 5/1998
(Continued)

OTHER PUBLICATIONS

Seiji et al., Refrigerating Unit, Jul. 13, 1999, JPH11190569A, Whole Document.*
(Continued)

*Primary Examiner* — Larry Furdge
(74) *Attorney, Agent, or Firm* — Reed Smith LLP

(57) ABSTRACT

The present invention is directed to a method of operating an adsorption compressor system, which system comprises a hot source and a cold source and at least a first and a second adsorption bed, wherein the first bed has an initial temperature that is lower than the initial temperature of said second bed, in which system heat is circulated using a heat transfer fluid (HTF), the method comprising the following phases:
phase A) comprising the steps of:
heating the first adsorption bed by feeding HTF to it, coming from said second bed, optionally via said hot source, while maintaining a thermal wave in said first bed; and
cooling the second adsorption bed by feeding HTF to it, coming from said first bed, optionally via said cold source, while maintaining a thermal wave in said
(Continued)

second bed; wherein phase A) is maintained until the exit temperature of said first bed and said second bed are essentially the same and phase B) comprising the steps of:

feeding the HTF effluent of said first bed to said hot source and from said hot source back into said first bed; and feeding the HTF effluent of said second bed to said cold source and from said cold source back into said second bed; wherein phase B) is maintained until the temperature in said first bed is essentially homogeneous and the temperature in said second bed is also essentially homogeneous and lower than the temperature of said first bed, wherein the flow rates of said HTF through said first and second bed may be higher than in phase A).

5 Claims, 28 Drawing Sheets

(51) Int. Cl.
F25B 17/08 (2006.01)
F25B 35/04 (2006.01)
F25B 25/02 (2006.01)

(52) U.S. Cl.
CPC ......... F25B 2500/01 (2013.01); Y02A 30/278 (2018.01); Y02B 30/64 (2013.01)

(56) References Cited

U.S. PATENT DOCUMENTS

| 4,637,218 A | 1/1987 | Tchernev |
| 5,309,985 A | 5/1994 | Erickson |
| 5,505,059 A | 4/1996 | Sanborn |

FOREIGN PATENT DOCUMENTS

| JP | 06213528 | | 8/1994 |
| JP | H11190569 A | * | 7/1999 |
| JP | 2001304715 | | 10/2001 |
| JP | 2004333027 | | 11/2004 |
| WO | 1981000904 | | 4/1981 |
| WO | 198606821 | | 11/1986 |
| WO | 198802089 | | 3/1988 |
| WO | 2010049147 | | 5/2010 |

OTHER PUBLICATIONS

Hu, et al. "Analysis for composite zeolite/foam aluminum-water mass recovery adsorption refrigeration system driven by engine exhaust heat," Energy Conversion and Management, 50:255-261, 2009.

Maggio, et al. "A dynamic model of heat and mass transfer in a double-bed adsorption machine with internal heat recovery," International Journal of Refrigeration, 29:589-600, 2006.

Satheesh, et al. "Performance investigations of a single-stage metal hydride heat pump." International Journal of Hydrogen Energy, 35:6950-6958, 2010.

Dehouche, et al. "Modelling and Simulation of Heating/Air-Conditioning Systems Using the Multi-Hydride-Thermal-Wave Concept," Applied Thermal Engineering, 18(6):457-480, 1998.

Tamainot-Telto, et al. "Novel compact sorption generators for car air conditioning," International Journal of Refrigeration, 32:727-733, 2009.

Lambert, et al. "A Review of Solid-Vapor Adsorption Heat Pumps," American Institute of Aeronautics and Astronautics, AIAA 2003-0514, Jan. 6-10, 2003.

Riffel, et al. "Transient modeling of an adsorber using finned-tube heat exchanger," International Journal of Heat and Mass Transfer, 53:1473-1482, 2010.

Linder, et al. "Experimental results of a compact thermally driven cooling system based on metal hydrides." International Journal of Hydrogen Energy, 35:7623-7632, 2010.

Demir, et al. "The use of metal piece additives to enhance heat transfer through an unconsolidated adsorbent bed," International Journal of Refrigeration, 33:714-720, 2010.

Muthukumar, et al. "Metal hydride based heating and cooling systems: A review" International Journal of Hydrogen Energy, vol. 35, No. 8, Apr. 1, 2010, p. 3825.

Leong, et al. "System performance of a combined heat and mass recovery adsorption cooling cycle: A parametric study" International Journal of Heat and Mass Transfer, vol. 49, No. 15-16, Jul. 1, 2006, pp. 2703-2711.

* cited by examiner

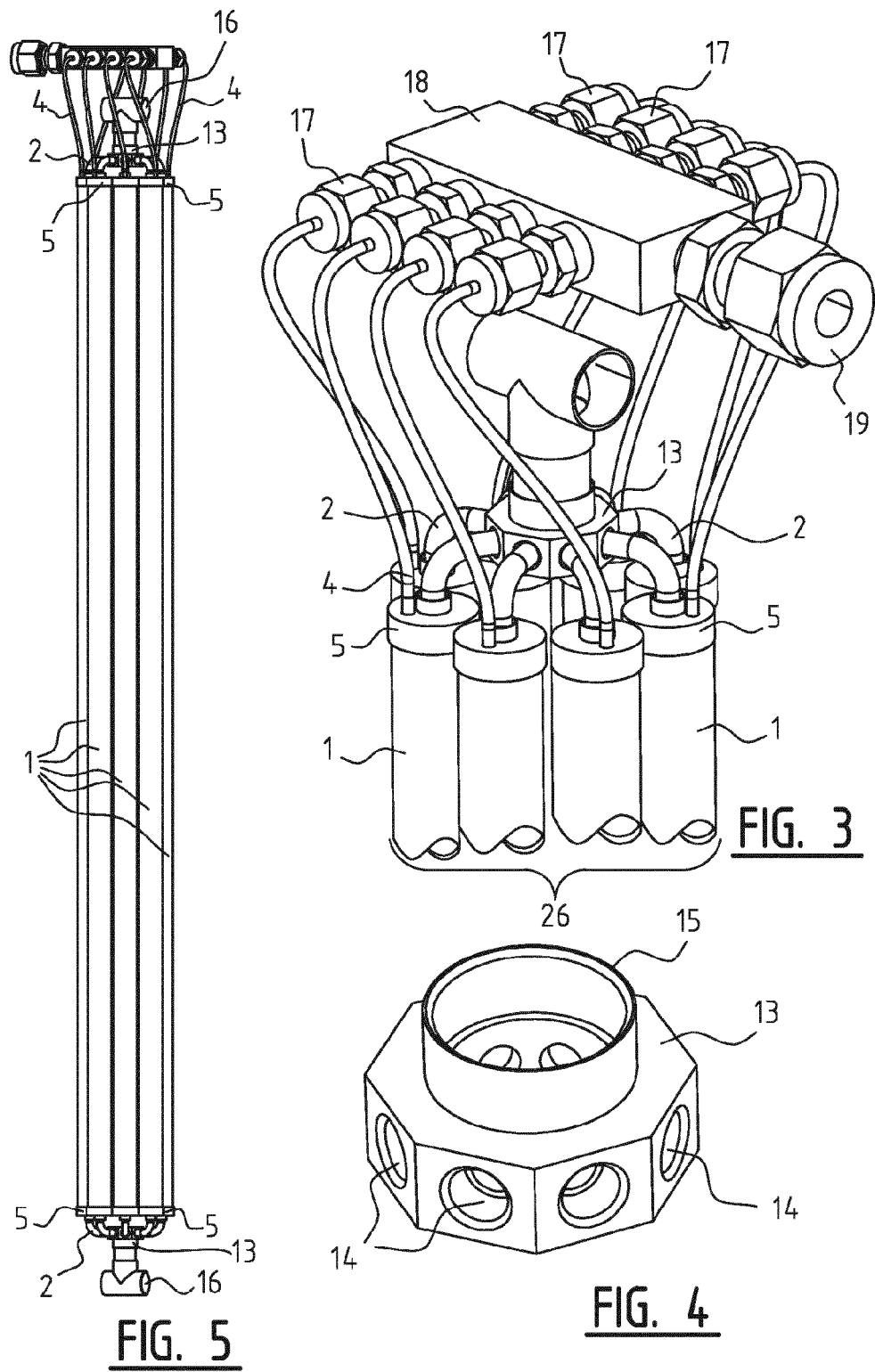

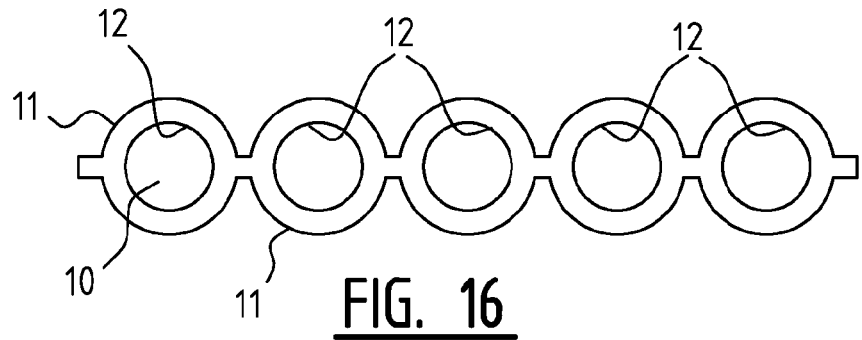
FIG. 16
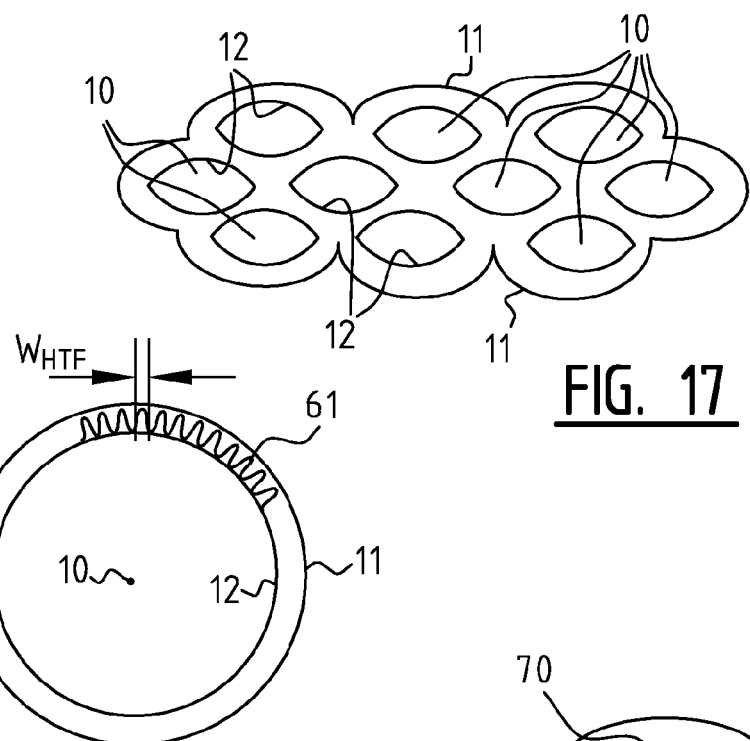
FIG. 17
FIG. 15
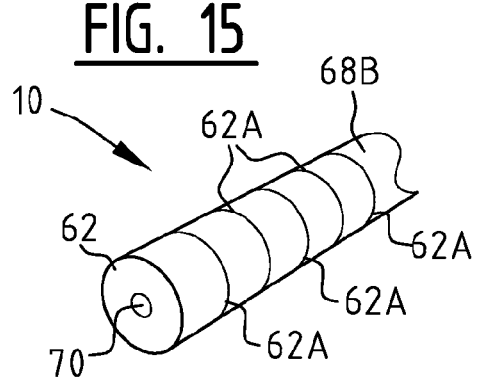
FIG. 18A
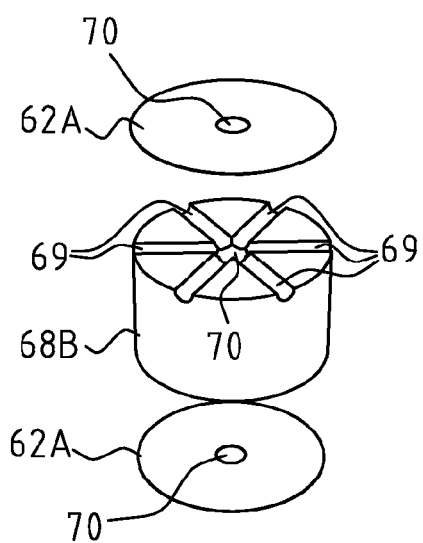
FIG. 18B

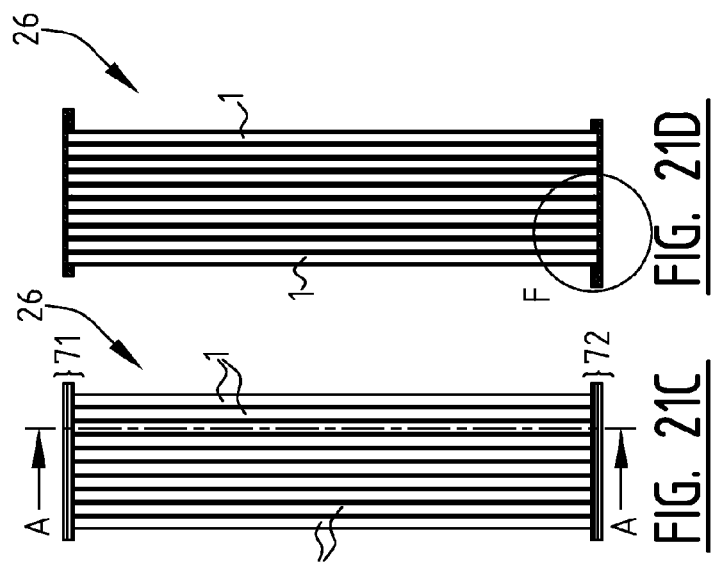
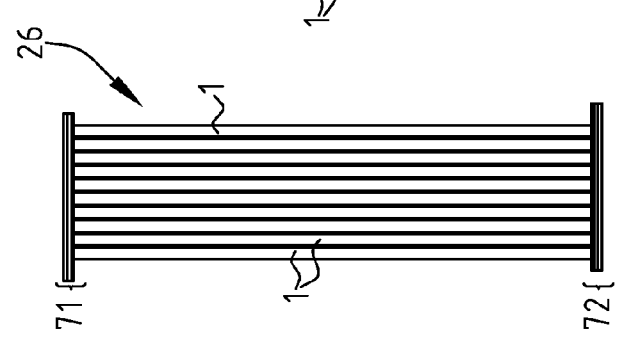
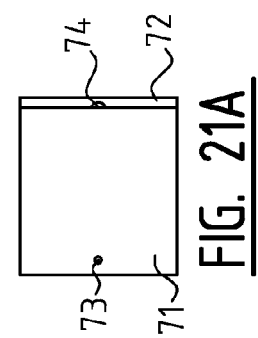
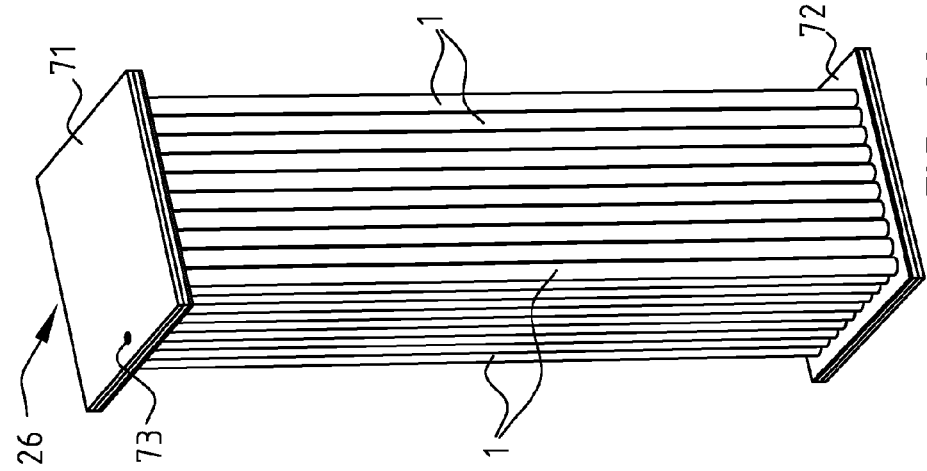

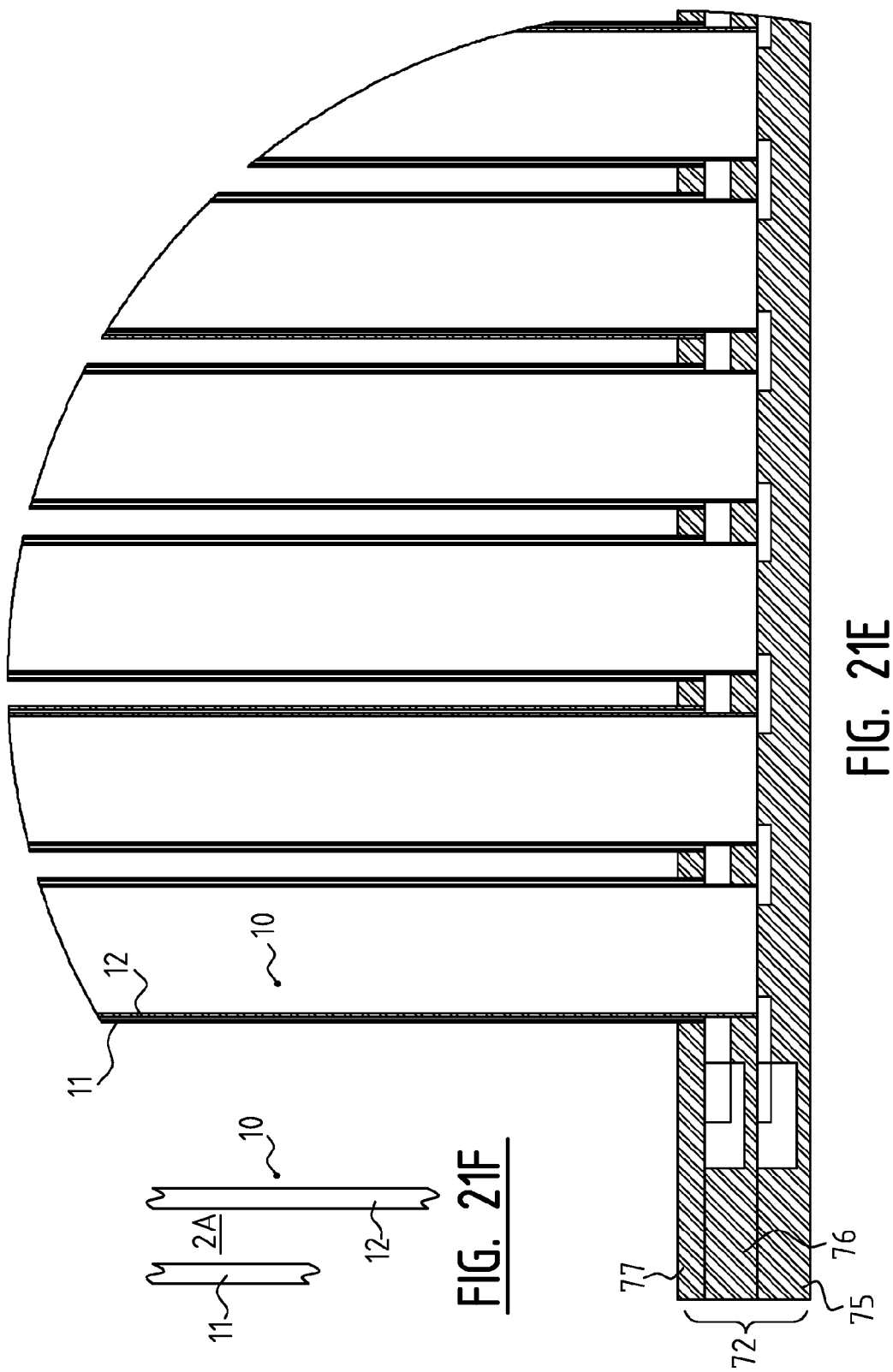

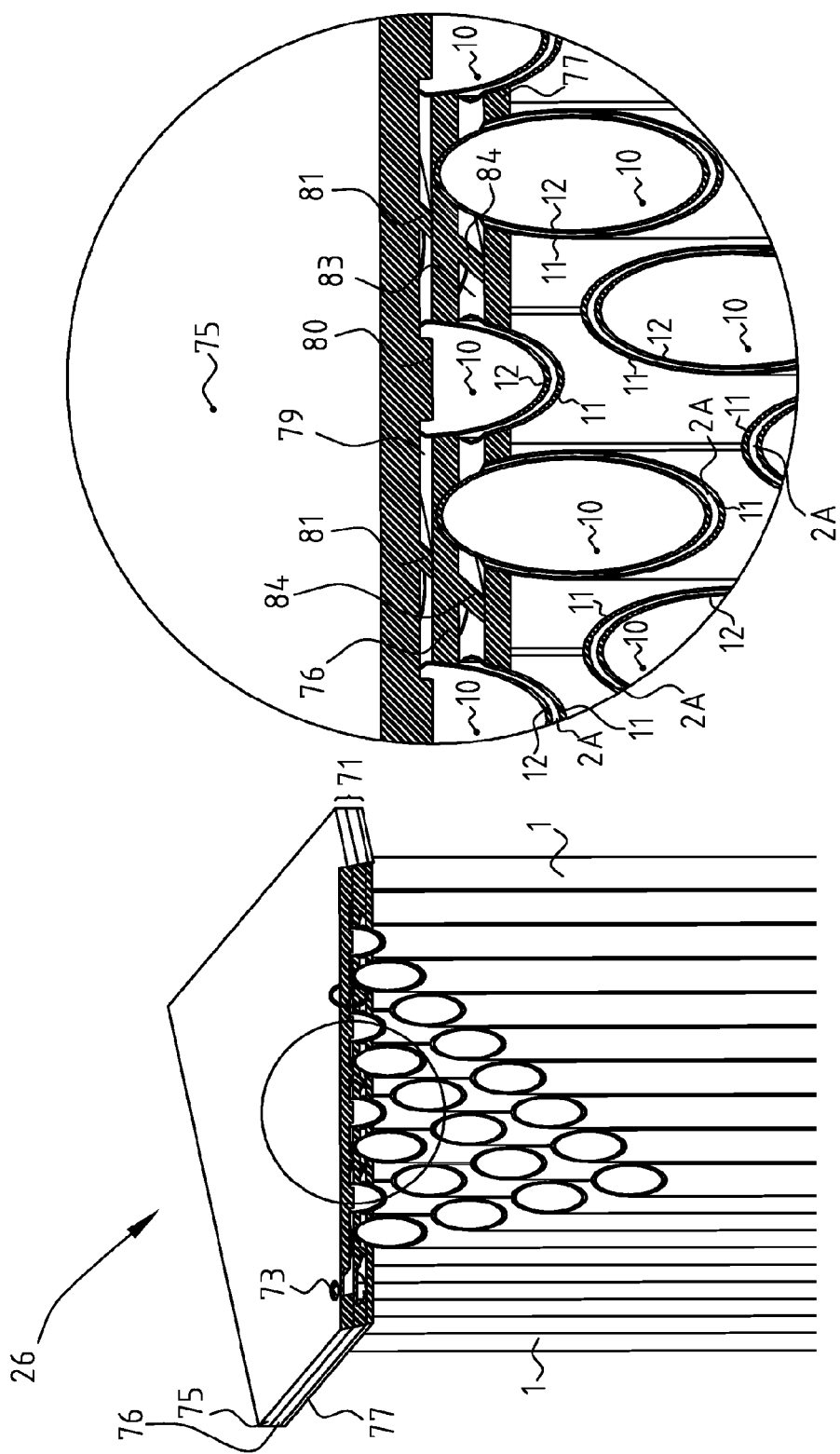

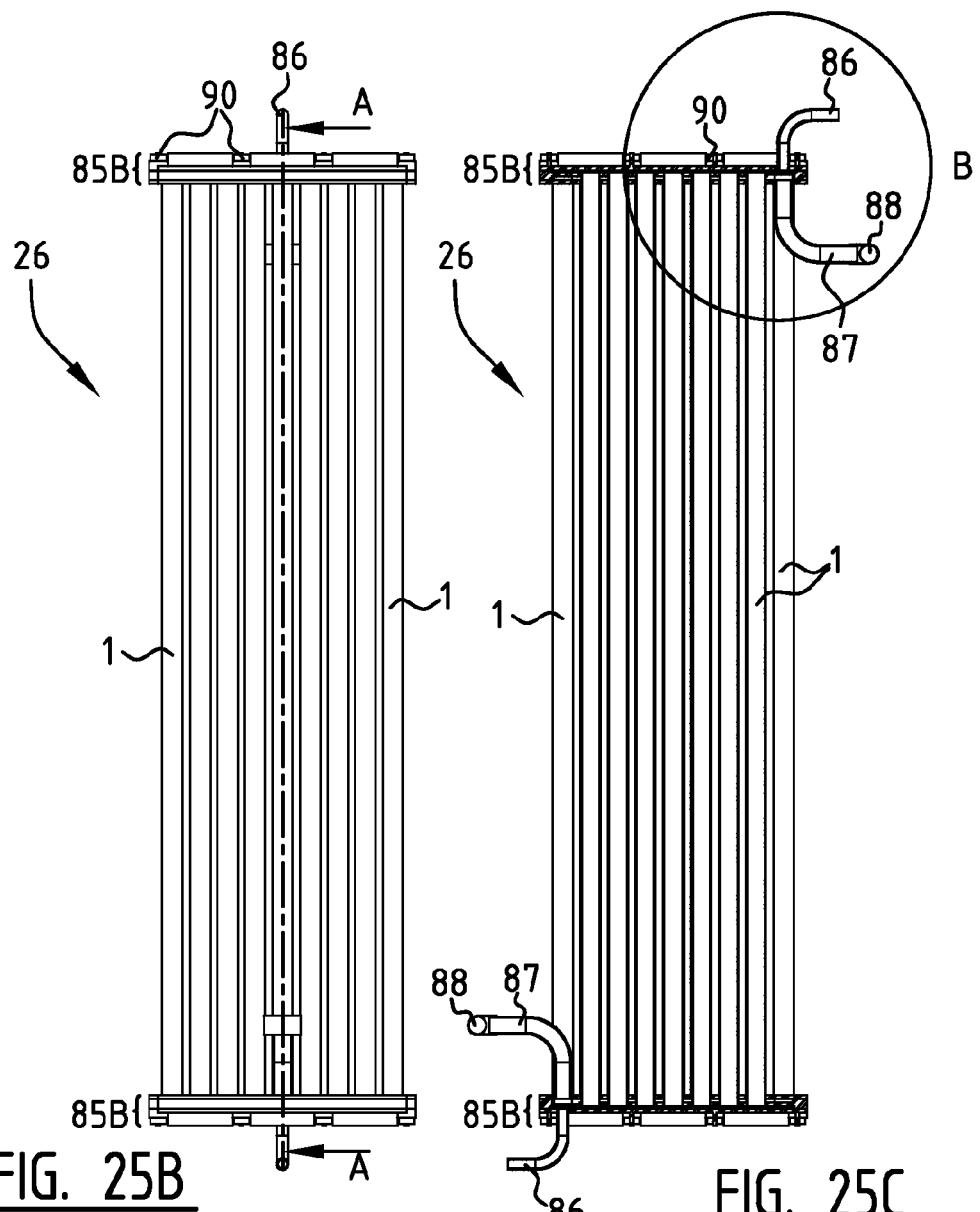
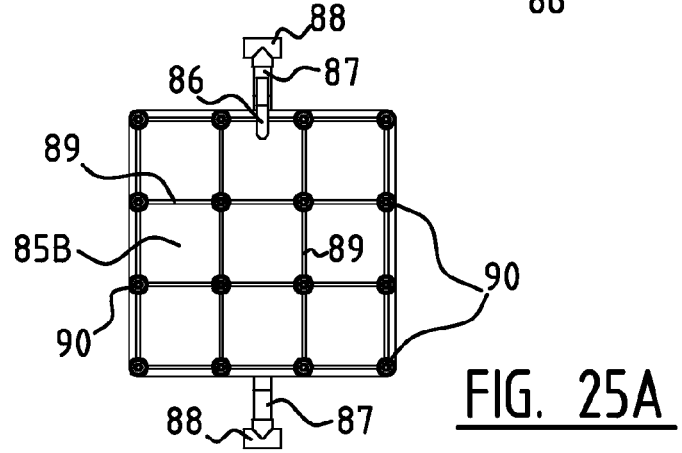
FIG. 25B   FIG. 25C
FIG. 25A

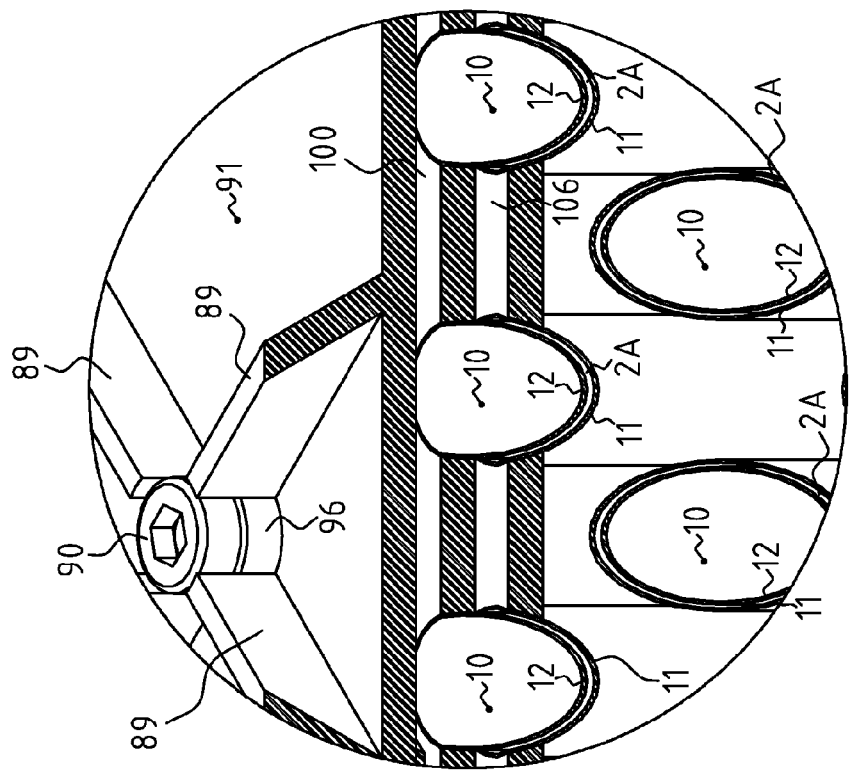
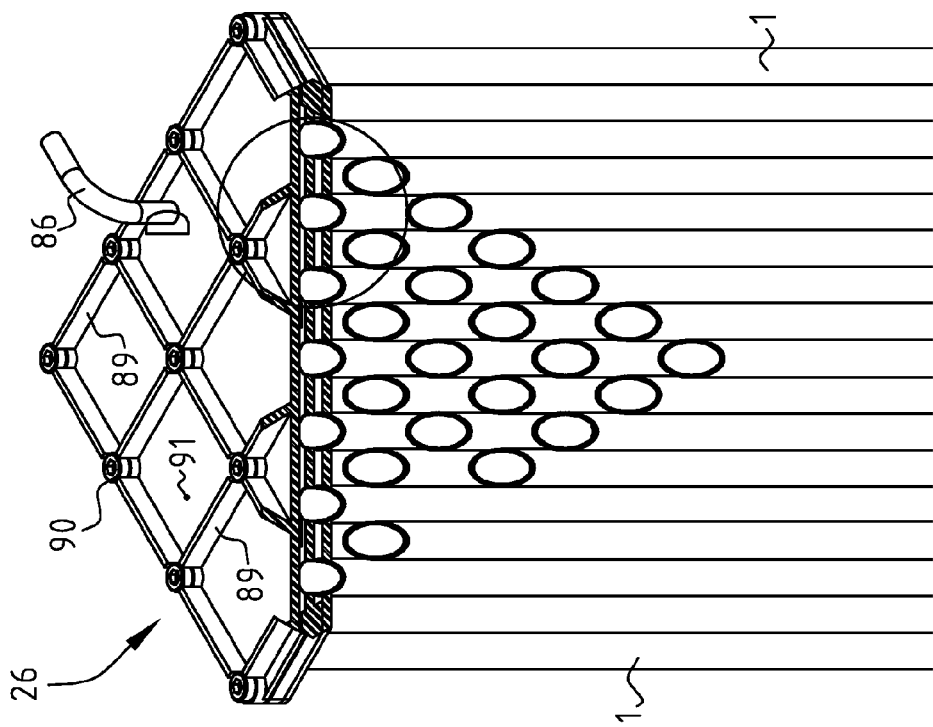
FIG. 27A
FIG. 27B

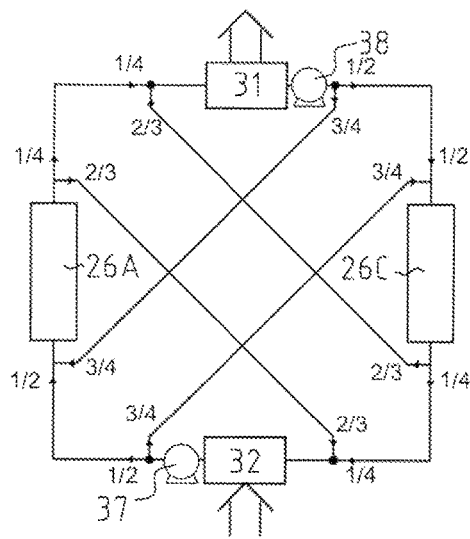
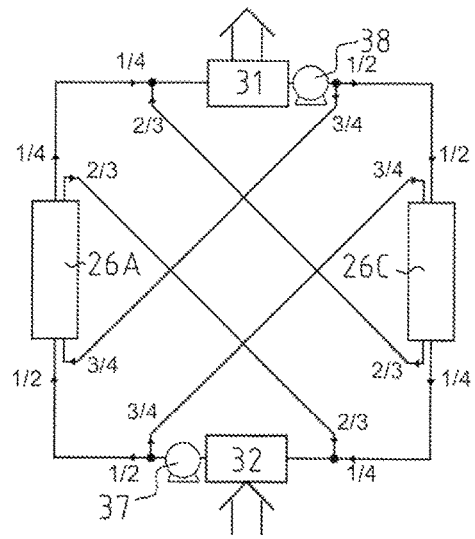
Fig. 31A   Fig. 31B
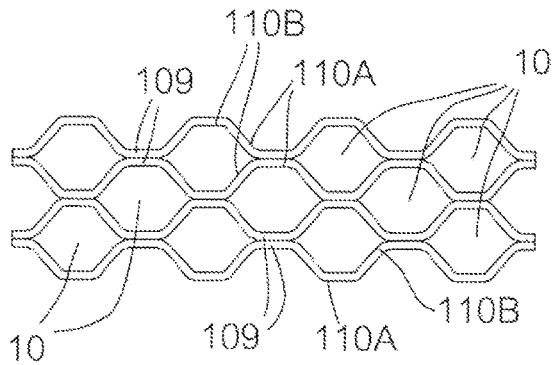
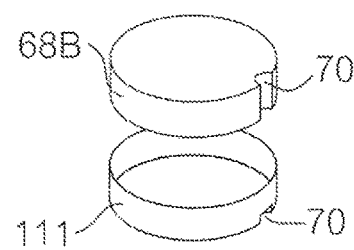
Fig. 34   Fig. 35
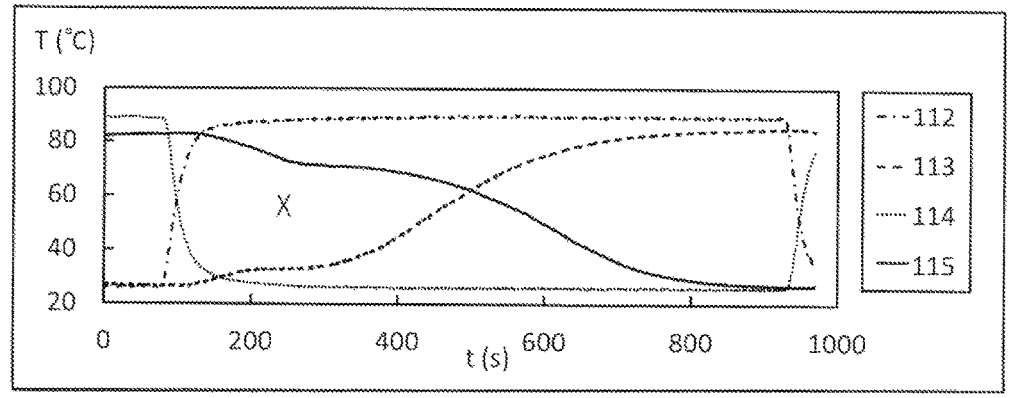
Fig. 36

METHOD FOR OPERATING AN ADSORPTION COMPRESSOR AND ADSORPTION COMPRESSOR FOR USE IN SAID METHOD

RELATED APPLICATIONS

This application is the United States National Stage of International Application No. PCT/NL2012/050105, filed Feb. 22, 2012, which was published as International Publication No. WO 2012/115513, and which claims benefit of The Netherlands Patent Application No. 2006277 filed Feb. 22, 2011. Both applications are incorporated by reference in their entirety herewith.

The invention relates to an adsorption compressor and a method of operation thereof. More specifically, the invention relates to adsorption compressors integrated in a heat pump, in which the compressors make use of a thermal wave through a bed of solid adsorbents. Such compressors are for instance described in U.S. Pat. No. 4,610,148, incorporated herein in its entirety, wherein two beds of adsorbents are used, which are arranged in a shell through which heat exchanging channels are arranged. The heat exchanging channels are connected to a closed circuit of heat exchanging fluid comprising a set of pumps, an additional heat exchanger with cooling action and a heat exchanger with heating action. The shell sides of these adsorbent beds are connected to a heat pump comprising a condenser, an expansion valve and an evaporator. These two beds each are connected both to the condenser and the evaporator side of the heat pump by means of check valves. Further examples of publications that discuss thermal waves in adsorption heat pumps are U.S. Pat. No. 4,637,218; Jones J. A. (Heat recovery systems & CHP 13 (1993)363-371); Pons M., Applied thermal engineering, 16 (1996)395-404); Sun L. M. et al. (Int. J. Heat mass transfer, 40 (1997)281-293); Zheng W. et al. (Heat and mass transfer 31 (1995)1-9); Wang, R. Z. (Renewable and sustainable energy reviews 5 (2001)1-37); and Critoph, R. E. et al. (Applied Thermal Engineering 24 (2004)661-678).

The beds in U.S. Pat. No. 4,610,148 comprise a zeolite, and the applied refrigerant or adsorbing vapor is water. The water vapor originating from the adsorption beds is guided through a set of check valves to a condenser of a heat pump. There the water vapor is condensed in a high pressure condenser, and the condensed water is guided through a pressure release valve, where due to the Joules Thomson effect, the temperature decreases substantially adiabatically, thus providing cooling capacity. In a low pressure evaporator, the water is re-evaporated and can be returned through a set of check valves to that adsorption bed that is cold and accepting the vapor to adsorb. The evaporator provides the actual thermal cooling power of the heat pump.

The adsorbing vapor is forced out of the solid adsorption material by heating the material with a heat transfer fluid. In order to have a substantially constant cooling power in the evaporator, two adsorption beds are chosen. One bed is heated to force out the adsorption vapor while the other is cooled down in order to provide re-adsorption of the adsorption vapor.

A series of check valves allows this alternating operation such that at substantially all times, high pressure vapor is provided to the condenser while relative low pressure vapor is retracted from the evaporator.

In order to increase efficiency in relation to batch cooling and batch heating of the adsorbing material, it was found that heating and cooling the solid adsorbing material by applying a moving temperature profile back and forth through the solid material substantially increased the heat pump performance. This pushing back and forth a temperature profile through the relatively elongated material is known as a thermal wave.

Application of such thermal wave has some further advantages, that only two adsorption cells are needed, a relative simple process flow diagram is needed and a relative uniform refrigerant mass flow over the entire cycle can be provided.

These systems are used because the driving heat can originate from low caloric waste heat or solar heat and the used adsorption vapors or gases can be chosen from non-freon types, which are harmless for the ozone layer.

Disadvantages of these systems are that the condenser, the evaporator and the two adsorbent beds are relative bulky in size. Since water is used as refrigerant, the whole system can only operate at reduced pressures, thus lowering the specific cooling power (SCP) of this system.

An alternative heat pump using zeolite as an adsorbent is presented in U.S. Pat. No. 4,637,218, incorporated herein in its entirety. In this system, again, water is used as a refrigerant medium. In this publication a shell-and-tube arrangement of the adsorption beds and mono block like arrangements of the adsorption bed are proposed. This system, again, suffers from the rather bulky size because of the relative low pressures applied for the evaporation and condensation of the water vapor.

P. Hu et al. (Energy Conversion and Management 50 (2009)255-261) describe a refrigeration system comprising an adsorbent bed in an annular container, wherein the heat exchange fluid is on the inside.

A. Sateesh et al. (International Journal of Hydrogen Energy 35 (2010)6950-6958) describe a single-stage metal hydride heat pump. This heat pump is based on an absorption process, wherein the metal hydride powder undergoes a chemical change. The term "absorption process" is generally reserved for processes based on chemical absorption, whereas "adsorption process" refers to physical adsorption.

Z. Dehouche et al. (Applied Thermal Engineering 18 (1998)457-480) describe the thermal wave concept for a multi-hydride system. This system is also based on chemical changes, rather than physical changes in accordance with the present invention.

WO-A-2010/049147 describes a traditional batch type heat regeneration process. The use of a thermal wave is not disclosed or suggested.

U.S. Pat. No. 5,505,059 describes a method of operating a heat pump system, which does not require a heat transfer fluid. Instead, the refrigerant, such as ammonia is used to both heat and cool the adsorption beds.

Although the known thermal wave based adsorption heat pump systems result in an improvement of efficiency, in particular with respect to coefficient of performance (COP) and specific cooling power (SCP), it is still desirable to improve on COP and SCP.

It is an object of the invention to mitigate or solve the above described and/or other problems of the heat pumps and the adsorption compressors in the art, while maintaining and/or improving the advantages thereof. More specifically, an object of the invention can be to reduce the size of the complete heat pump and the size of the adsorption compressor, to provide more practical bed arrangements and to provide a system and a method that is more economical and efficient in its operation. A further object is to provide a method of operating an adsorption compressor having improved COP and SCP.

These and/or other objects are reached by a method of operating an adsorption compressor system, which system comprises a hot source and a cold source and at least a first and a second adsorption bed, wherein the first bed has an initial temperature that is lower than the initial temperature of said second bed, in which system heat is circulated using a heat transfer fluid (HTF), the method comprising the following phases:

phase A) comprising the steps of:
heating the first adsorption bed by feeding HTF to it, coming from said second bed, optionally via said hot source, while maintaining a thermal wave in said first bed; and
cooling the second adsorption bed by feeding HTF to it, coming from said first bed, optionally via said cold source, while maintaining a thermal wave in said second bed; wherein phase A) is maintained until the exit temperature of said first bed and said second bed are essentially the same and phase B) comprising the steps of:
feeding the HTF effluent of said first bed to said hot source; and
feeding the HTF effluent of said second bed to said cold source;

wherein phase B) is maintained until the temperature in said first bed is essentially homogeneous and the temperature in said second bed is also essentially homogeneous and lower than the temperature of said first bed, wherein the flow rates of said HTF through said first and second bed may be higher than in phase A).

In the prior art thermal wave systems, a single HTF loop is used incorporating the two adsorption beds with a heating and cooling device located in between them. A reversible pump or a one-way pump with suitable switching valves is used to reverse the thermal wave through the beds once the wave approaches one of the ends of the bed. In this way, a complete cycle is divided into two half-cycles. Each half-cycle begins after the flow direction of the heat transfer fluid is reversed. The switching moment of the flow reversal is taken before the thermal wave breaks through, viz. when it reaches the other side of the bed.

Without wishing to be bound by theory, the present inventors believe that in reality, the thermal wave is significantly less steep than originally suggested in the prior art (e.g. in U.S. Pat. No. 4,610,148 and U.S. Pat. No. 4,637,218). This means that the thermal wave has a rather flat temperature profile along the length of the cell so that much of the adsorbed refrigerant towards the end of the cell is not yet ad- or desorbed when the wave reverses, which limits the SCP significantly. One way to improve this would be to allow more refrigerant to be adsorbed or desorbed and higher SCP values can be achieved if the thermal wave is allowed to progress more towards the end of the cell so that more refrigerant can be ad- and desorbed during one half-cycle. However, in this situation the COP deteriorates rapidly due to the progressively increased temperature differences over the heating and cooling devices. Thus there is a trade-off between COP and SCP The present invention provides a new thermal wave cycle which improves the SCP while maintaining a high COP.

The invention can be illustrated while referring to FIG. 29A-D. For simplicity in this figure only the flow direction of HTF is indicated, while the refrigerant fluid connections and flows are not drawn. It is to be understood that the refrigerant fluid connections may be located at either side of the beds, or even at both sides of the bed. In this last situation, one side can be connected via a check valve to the refrigerant high pressure line and the other side can be connected via a check valve to the refrigerant low pressure line.

The refrigerant can in principle be any substance known in the art for this purpose. Preferably the refrigerant is selected from ammonia, water (steam), carbon dioxide, methanol, n-butane and the like. Most preferred is ammonia, in particular in combination with active carbon as adsorption material.

The adsorbent can in principle be any substance known in the art for this purpose. Preferably it is selected from active carbon, zeolites, metal organic frameworks, $BaCl_2$ and the like.

According to the invention the entire adsorption and desorption cycle is split into four (instead of two) phases, of which phases A and C are heat regenerating phases and phases B and D are non heat regenerating phases. The adsorption beds in the system need to be suitable for a thermal wave operated adsorption compressor.

In phase A, bed 1 is heated by high-temperature HTF from the hot source. Because of the thermal wave operation, initially low-temperature HTF exits bed 1, after which this HTF is further cooled by the cold source. At the same time, bed 2 is cooled by this low-temperature HTF from the cold source. Again because of the thermal wave operation, initially high-temperature HTF exits bed 2, after which this HTF is further heated by the hot source.

At a certain point phase 2 is started, basically when the two temperatures of the HTF exiting bed 1 and 2 are essentially equal to each other. These exit temperatures are considered essentially the same when the absolute temperature difference between the exit temperatures is less than 40%, preferably less than 30%, more preferably less than 20%, even more preferably less than 10%, typically from 0-5%, of the temperature difference between the hot and cold sources. A HTF switching system can be used to connect bed 1 directly to the hot source and bed 2 directly to the cold source to finalize the thermal wave in the beds without heat regeneration, until the temperatures of the beds are essentially uniform.

In phase A heat is regenerated between both beds. In the example depicted in FIG. 28 the maximum quantity of heat that can be regenerated is (under the assumption of a constant HTF flow in time) proportional to area X. This maximum quantity of heat is reached when the exit temperatures of the first bed and the second bed are essentially the same as defined above.

In phase B, the bed temperatures are considered essentially homogeneous when the absolute difference between the entrance and exit temperatures is less than 30%, preferably less than 20%, more preferably less than 10%, even more preferably less than 5% of the temperature difference between the hot and cold source.

FIGS. 12 and 28 show examples of the exit temperatures of bed 1 and bed 2 during the phases A and B. The shaded area A is proportional to the heat that needs to be supplied by the heater to the HTF during the heat regenerating phase, and the shaded area B is proportional to the heat that needs to be supplied during the non regenerating phase.

At the end of phase B, the first bed that was first cold is now the hotter bed, while the second bed that was first hot is now the cooler bed. The operation can be repeated as described above, but now with the roles of the two beds interchanged.

For example, next, a new heat regenerating phase may be started in phase C. Operation is similar to phase A but the role of beds 1 and 2 is reversed: bed 1 is cooling and bed 2 is heating. This is followed by phase D, which is another non-regenerative phase with the role of beds 1 and 2 reversed.

In the system of the present invention the direction of the thermal wave in the beds may be the same for all phases and this is preferred. Alternatively, after phases A and B the HTF flow direction and thermal wave direction can be reversed in phases C and D, as depicted schematically in FIG. 30. This requires, however, a different and more complicated HTF fluidic switching system.

Many modifications and alterations are possible based on the above-described principle, as will become clear in the following.

For instance, the switching between phases may be carried out by using switching valves, in particular three-way valves. Alternatively separate lines with two-way valves can be used, as is depicted in FIGS. 32A-D. Four-way valves may also be used, see FIGS. 33A-D.

One of the additional advantage of the invention is that the pumps are used only have to operate in a one-way direction, which allows the use of standard components and engineering practices.

In a preferred embodiment of the invention an adsorption cell is provided suitable for a thermal wave operated adsorption compressor comprising an elongated solid adsorption material; an elongated heat transfer fluid channel in direct heat transferring contact with the solid adsorption material, wherein the characteristic dimension r of the adsorption material is chosen such that the relation:

$$\frac{r^2}{\lambda_{eff}} < \frac{\gamma}{SCP}$$

is fulfilled, wherein eff is the effective thermal conductivity, $\gamma$ is a design parameter and SCP is the specific cooling power, wherein $\gamma$<0.0025 K·m³/kg, wherein SCP>250 W/kg and wherein 0.5<eff<20 W/mK. The characteristic dimension r may be taken as the radius of the adsorption material in case the adsorption cell has a circular cross-section. In case the cross-section is non-circular (e.g. polygonic or elliptical), r is the equivalent radius, viz. the radius of a circle having the same surface area as the non-circular cross-section in question.

The characteristic dimension of the heat transfer fluid channel $d_{HTF}$ can be chosen such that the relation:

$$Biot = \frac{Nu}{0} \frac{\lambda_{HTF}}{\lambda_{eff}} \frac{r}{d_{HTF}} > 1$$

Is fulfilled, wherein Biot is Biot Number, HFT is the effective thermal conductivity of the heat transfer fluid, Nu is Nusselt Number, $d_{HTF}$ is the characteristic dimension of the heat transfer channel, wherein 0.1<HTF<10 W/m·K, Biot Number >1 and wherein 4<Nu<6.

By these specific dimensions an efficient operation can be obtained, as is explained in further detail herein below.

The characteristic dimension of the heat transfer fluid channel can be less than 1 mm and the characteristic dimension of the adsorption material is preferably less than 1 cm. The adsorption material can be arranged in a inner cylindrical wall, provided with a central refrigerant channel. The heat transfer fluid channel can be an annular heat transfer fluid channel, coaxially arranged around the adsorption material between the inner (cylindrical) wall and an outer (cylindrical) wall.

The invention further relates to a cluster comprising a matrix of adsorption cells as described herein above, wherein the annual heat transfer fluid channels of the individual adsorption cells are in fluid connection on both distal ends with a heat transfer fluid header, which is a manifold that can collect or distribute the heat transfer fluid and wherein the central refrigerant channels of the individual adsorption cells are in fluid connection on one or both distal ends with a refrigerant header, which is also a manifold and that can collect or distribute the refrigerant.

The heat transfer fluid manifold and the refrigerant manifold of this cluster can be arranged in substantially plate shaped distribution elements that can be arranged at the ends of the elongated adsorption cells.

The distribution elements can comprise three stacked plates: a first closing plate having openings connected to and surrounding the outer wall of adsorption cells, an intermediate plate having openings connected to and surrounding the inner wall of the adsorption cells, a second closing plate, wherein the heat transfer manifold is arranged between the first closing plate and the intermediate plate and wherein the refrigerant manifold is arranged between the intermediate plate and the second closing plate.

The heat transfer manifold can be machined in, etched in, pressed, punched or embossed in the first closing plate and/or the intermediate plate. The refrigerant manifold can similarly be machined in, etched in, pressed, punched or embossed in the intermediate and/or the second closing plate.

The plates can be at each distal end of the cluster and can be glued, welded, soldered or bolted together.

The cluster can comprise parallel cells wherein the annular heat transfer fluid channels of each individual adsorption cell are connected to distribution connectors at their distal ends and refrigerant connectors at one or both distal ends.

The distribution connectors can be any shape and ideally results in identical flow in each of the individual cells. They can be for instance rotation symmetrical spider shaped connectors, with each heat transfer fluid leg having substantially the same shape as the other heat transfer fluid legs. A T-connector can be connected to each of the distribution connectors or to the heat transfer manifolds or alternatively, the distribution connectors or the heat transfer manifolds are provided with two separate connectors.

The invention further relates to an adsorption compressor, comprising at least two of the above described clusters, wherein each of the arms of the T-connectors of first sides of the clusters are in fluid connection with a switching side of a first pair of three way valves, in such a way that the different arms of each individual T-connector is in fluid connection with the switching side of a different three way valve and wherein each of the arms of the T-connectors of second sides of the clusters are in fluid connection with a switching side of a second pair of three way valves, in such a way that the different arms of each individual T-connector is in fluid connection with the switching side of a different three way valve.

The base sides of the first pair of three way valves can be in fluid connection with a heater or heat exchanger, which is configured to enhance the temperature of heat transfer fluid passing through and wherein the base sides of the second pair of three way valves can be in fluid connection with a cooler or heat exchanger, which is configured to cool the heat transfer fluid passing through. The base side of the first three way valve of the first pair of three way valves and the base side of a first three way valve of the second pair of three way valves can be in fluid connection with a heat exchanger or heater and wherein the base side of the second three way valve of the first pair of three way valves and the base side of a second three way valve of the second pair of three way valves can be in fluid connection with a heat exchanger or cooler.

The heat transfer fluid channel can be provided with a radial conductor, e.g. a corrugated plate.

The adsorption material and/or the refrigerant channel of each of the cells or clusters can be through a set of check valves in fluid contact with a refrigerant loop, which can comprise a condenser, an evaporator and an expansion valve configured in such a way that the refrigerant is allowed in and out of the adsorption material of the cells or clusters and is allowed to be conducted in one direction only through the refrigerant loop.

The separate cells or clusters can be interconnected by a pressure equalizing conduit comprising a valve. The refrigerant loop can further be in fluid connection with an auxiliary container, comprising an adsorption mass and a temperature controllable heater.

The invention also relates to an adsorption compressor, suitable for thermal wave operation, comprising two clusters of adsorption cells, each cluster comprising heat transfer fluid channel, wherein the heat transfer fluid channels of the individual clusters are in fluid connection with a manifold, wherein the manifold is connected to a T-connector, wherein each of the arms of the T-connectors of first sides of the clusters are in fluid connection with a switching side of a first pair of three way valves, in such a way that the different arms of each individual T-connector is in fluid connection with the switching side of a different three way valve and wherein each of the arms of the T-connectors of second sides of the clusters are in fluid connection with a switching side of a second pair of three way valves, in such a way that the different arms of each individual T-connector is in fluid connection with the switching side of a different three way valve.

The base sides of the first pair of three way valves can be in fluid connection with a heater or heat exchanger, which is configured to enhance the temperature of heat transfer fluid passing through and wherein the base sides of the second pair of three way valves can be in fluid connection with a cooler or heat exchanger, which is configured to cool the heat transfer fluid passing through.

The base side of the first three way valve of the first pair of three way valves and the base side of a first three way valve of the second pair of three way valves can be in fluid connection with a heat exchanger or heater and wherein the base side of the second three way valve of the first pair of three way valves and the base side of a second three way valve of the second pair of three way valves can be in fluid connection with a heat exchanger or cooler.

The invention further relates to an adsorption cell comprising adsorption material wherein the adsorption material is arranged in a cylindrical inner wall, provided with a central refrigerant channel and wherein an annular heat transfer fluid channel is coaxially arranged around the adsorption material between the inner wall and an outer wall.

The invention also encompasses a cluster comprising a matrix of adsorption cells as described hereinabove, wherein the annual heat transfer channels of the individual adsorption cells are in fluid connection with a heat transfer fluid manifold and wherein the central refrigerant channels of the individual adsorption cells are in fluid connection with a refrigerant manifold. The heat transfer manifold and the refrigerant manifold can be arranged in substantially plate shaped distribution elements arranged at the ends of the elongated adsorption cells.

The distribution elements in this cluster can comprise three stacked plates: a first closing plate having openings connected to and surrounding the outer wall of adsorption cells, an intermediate plate having openings connected to and surrounding the inner wall of the adsorption cells, a second closing plate, wherein the heat transfer manifold is arranged between the first closing plate and the intermediate plate and wherein the refrigerant manifold is arranged between the intermediate plate and the second closing plate. The heat transfer manifold can be machined in or etched in the intermediate plate and the refrigerant manifold can be machined in or etched in the intermediate or the second closing plate.

The plates can be at each side of the cluster are glued, welded, soldered or bolted together.

The invention also relates to a method of cooling or heating e.g. by using a relative low caloric heat such as a solar boiler or a waste heat stream or a high caloric heat source such as a gas flame, wherein the method comprises the following steps to be executed in any suitable order: a) providing an adsorption compressor as described hereinabove, b) heating in a first mode the adsorption material in a first cluster by gently pumping hot heat transfer fluid exiting from a heater in a laminar flow through the heat transfer fluid channel of the adsorption cells of cluster, such that a substantially steep decreasing heat profile in axial direction, i.e. a thermal wave is maintained and gently pushed along the length of the elongated adsorption cells within the first cluster, wherein the adsorbed refrigerant is desorbed from adsorption material of the first cluster at relative high pressure, forced through a check valve towards condenser, condensed and forced through an expansion valve and left to evaporate and perform cooling action in an evaporator, c) cooling during step b) in a first mode the adsorption material in a second cluster by gently pumping cold heat transfer fluid exiting from a cooler in a laminar flow through the heat transfer fluid channel of the adsorption cells of cluster, such that a substantial steep increasing heat profile in axial direction, i.e. a thermal wave is maintained and gently pushed along the length of the elongated adsorption cells within the second cluster, wherein the refrigerant is adsorbed by the adsorption material of the second cluster at relative low pressure, originating from the evaporator through check valve, d) switching at a predetermined moment, to a second mode, cooling the adsorption material in a first cluster by gently pumping cold heat transfer fluid exiting from a cooler in a laminar flow through the heat transfer fluid channel of the adsorption cells of cluster, such that a substantially steep increasing heat profile in axial direction, i.e. a thermal wave is maintained and gently pushed along the length of the elongated adsorption cells within the first cluster, wherein the refrigerant is adsorbed by the adsorption material of the first cluster at relative low pressure, originating from the evaporator through check valve, e) heating during step d) in the second mode the adsorption material in a second cluster by gently pumping hot heat transfer fluid exiting from a heater in a laminar flow through the heat transfer fluid channel of the adsorption cells of cluster, such that a substantially steep decreasing heat profile in axial direction, the thermal wave is maintained and gently pushed along the length of the elongated adsorption cells within the second cluster, wherein the adsorbed refrigerant is desorbed from adsorption material of the second cluster at relative high pressure, forced through check valve towards condenser, condensed and forced through expansion valve and left to evaporate and perform cooling action in evaporator, f) switching back in the first mode and repeating steps a-f.

In this method, the switching between the first and the second mode and vice versa can be performed by a series of three way valves. The direction of flow can be returned at every switch between modes, such that the cluster and the cluster have a hot and a cold side and the relative steep temperature profile is send back and forth through the individual clusters, and wherein the switching of mode is each time triggered by the arrival of the temperature profile at a cluster end, indicating the cluster in question is substantially fully heated and the other cluster is substantially cooled or vice versa.

The direction of flow in this method within the clusters is maintained, such that the steep temperature profiles or thermal waves of increasing and decreasing temperature are consequently pushed through the clusters in one direction only. In between the first mode and second mode and between the second and the first mode, each time a temperature equalizing mode can be switched, by shortcutting the cluster to be heated in a circuit with the heater only and at the same time shortcutting the cluster to be cooled in a circuit with the cooler only. The trigger to switch to shortcutting the clusters can be when the heat transfer fluid temperature exiting both cluster is substantially the same.

The herein described method can have a cycle time complies with the equation:

$$t_{cycle} = \frac{\Delta x_{net} \cdot \Delta h}{SCP}$$

wherein $t_{cycle}$ is the total cycle time of a sorption cell or cluster i.e. the total cycle time for the ad- and desorption mode, h is the enthalpy change [J/g] of the refrigerant gas that is providing the cooling power and $x_{net}$ is the net amount of gas that is ad- and desorbed from the adsorption material, such as carbon in one ad- and desorption cycle, expressed in gram gas per gram adsorption material.

The performance of these heat pumps is in general caught in two parameters, firstly the coefficient of performance (COP) and secondly the specific cooling power (SCP). The coefficient of performance is the ratio between the thermal cooling power $P_{cooling}$ and the thermal input power $P_{in}$.

$$COP = \frac{P_{cooling}}{P_{in}} \quad (1)$$

The specific cooling power is the thermal cooling power divided by the mass ($m_{adsorber}$) of the adsorber.

$$SCP = \frac{P_{cooling}}{m_{adsorber}} \quad (2)$$

In the heat pump according to the invention, the used adsorption material can be e.g. solid amorphous carbon containing material, and the refrigerant or adsorbing gas can be $NH_3$. With this specific combination of adsorbing material and adsorbing gas, a high SCP can be achieved, leading to a relative compact and light compressor.

Further advantages of such heat pump is a relative high COP and relative high thermodynamic efficiency, a relative high temperature flexibility without compromising on SCP and COP, a relative constant production of cold or heat, fast start up and stop times of typically in the minutes range and relative moderate costs.

A further aspect of the invention is a cell for an adsorption compressor, wherein the cell is comprising adsorption material and at least one separate heat transfer fluid channel in heat transfer contact with the adsorption material, wherein the relative dimensions of the diameter or height of the heat transfer channel, i.e the characteristic dimension of the heat transfer fluid channel in relation to the height or the characteristic dimension of the adsorption material and its material properties is dictated by the Biot number, wherein the Biot number is more than or equal to 1.

The Biot number represents herein the ratio of the heat resistance in the adsorption material and the heat resistance in the heat transfer fluid, as is presented in equation 3.

The heat resistance of the adsorption material can be deduced from geometric and material properties, the heat resistance in the heat transfer fluid can be deduced from the geometric aspects of the heat transfer fluid channel and the relevant Nusselt relation for the dominant flow regime inside the heat transfer fluid channel. In effect the lower the value of Biot below unity, the more of the radial heat difference is found within the heat transfer fluid, instead of within the adsorption material which will ultimately lead to an unwanted more flattened (dispersed) thermal wave for the given characteristic dimension (e.g. radius) and heat conductivity of the adsorption material. Accordingly, the Biot number should be larger than one for efficient operation. For a concentric heat transfer fluid jacket around an elongated circular tube containing adsorption material the relevant Biot relation can be represented by:

$$Biot = \frac{R_{inside}}{R_{surface}} = \frac{R_{inside}}{R_{HTF}} = \frac{\frac{1}{\lambda_{ads}}\frac{r}{2}}{\frac{1}{\lambda_{HTF}}\frac{4d_{HTF}}{Nu}} = \frac{Nu}{8}\frac{\lambda_{HTF}}{\lambda_{ads}}\frac{r}{d_{HTF}} \quad (3)$$

Wherein $R_{inside}$ and $R_{surface}$ are the thermal resistances of the adsorbents and the heat transfer fluid channel respectively. In order to increase the Biot number and thus to steepen the thermal wave for a given characteristic dimension e.g. radius (r) of the adsorption material and a given effective thermal conductivity of the adsorption material (ads), a series of design aspects can be considered: decreasing the characteristic dimension e.g. the diameter ($d_{HTF}$) of the heat transfer fluid channel, or increasing the effective thermal conductivity of the heat transfer fluid (HTF).

The Nusselt number in this relation is approximately 5, for laminar flow. Since turbulent flow is preferably to be avoided in order to keep the pressure drop low, this number is preferably not changed.

When the heat transfer fluid is water, the HTF is approximately 0.6 W/mK, when the adsorption material is commercially available amorphous carbon the ads is approximately 0.8 W/mK and when the characteristic dimension (e.g. radius) of the adsorption material is chosen to be 0.5 cm, the diameter of the heat transfer channel should be less than 1 mm, or less than approximately one fifth of the characteristic dimension (e.g. radius) of the adsorption material.

Concluding, for a proper efficient operation of the adsorption compressor, the dimensional relation between the diameter or height of the heat transfer channel and the characteristic dimension (e.g. radius) or height of the adsorption material should obey:

$$\frac{r}{d_{HTF}} > \frac{8}{Nu} \frac{\lambda_{ads}}{\lambda_{HTF}} \quad (4)$$

From this it follows that the heat transfer fluid channel should be small. On the other hand, the diameter or the height of the heat transfer fluid channel can not be chosen too small, because of efficiency losses due to increased hydraulic pressure drop over the length of the fluid transfer channel. The pressure drop p over an annular elongated channel for laminar flow is given by:

$$\Delta p = \dot{m} \cdot 6 \cdot \frac{\mu_{HTF}}{\rho_{HTF}} \cdot \frac{l}{\pi r d_{HTF}^3} \quad (5)$$

Wherein m is the mass flow of heat transfer fluid through the annular channel, $\mu_{HTF}$ is the dynamic viscosity of the heat transfer fluid, HTF is the density of the heat transfer fluid, r is the inner (equivalent) radius of the annular channel and $d_{HTF}$ is the height of the annular channel.

The mass flow through the channel is dictated by the thermal power needed in the cell $P_{in,HTF}$, the cycle time based average temperature difference between the temperature of the heat transfer fluid exiting the heater and the temperature of the heat transfer fluid entering the heater or the difference in temperature over the cooler T.

$$\dot{m} = \frac{P_{in,HTF}}{c_{p,HTF} \Delta T} \quad (6)$$

The thermal power needed, can be represented as the actual thermal cooling power $P_{cooling}$ divided by the COP.

$$P_{in} = \frac{P_{cooling}}{COP} \quad (7)$$

Wherein the cooling power actually is the specific cooling power times the mass of the adsorption material within the cell $m_{cell}$, see equation 2, which on its turn can be rewritten as a density ads times the volume of the adsorption material.

$$P_{cooling} = SCP \cdot m_{cell} = SCP \cdot \rho_{ads} \pi r^2 l \quad (8)$$

By combining the equations 6-8 with equation 5, the pressure drop can be expressed in only design parameters and specific properties of the heat transfer fluid in question.

$$\Delta p = 12 \cdot \frac{SCP}{COP \cdot c_{p,HTF} \cdot \Delta T} \cdot \rho_{ads} \cdot \frac{\mu_{HTF}}{\rho_{HTF}} \cdot \frac{r \cdot l^2}{d_{HTF}^3} \quad (9)$$

In order not to loose too much efficiency in pressure drop, this should typically not be more than approximately 1 bar when the heat transfer fluid is water. In case thermal oils are used, it should not exceed a few bars pressure.

A further aspect of the invention is an adsorption compressor comprising of at least two cells or clusters of cells of adsorption material, surrounded by or in heat transfer connection with a heat transfer fluid channel, the clusters each comprising T-connectors at their heat transfer fluid entrances and exits, wherein each of the branches of the T-connector is in fluid connection with a valve.

Due to this specific arrangement of a T-connector close to the cells or clusters, only a very limited section of heat transfer fluid conduits is confronted with both cold and hot heat transfer fluid. The smaller this section is, the less mixing losses between hot and cold fluid occurs, such that these mixing losses are minimised.

Each of the branches of the T-connector is in fluid connection with a valve, while the stem of the T connecter is in fluid connection with the heat transfer fluid channel of the cell or cluster of cells in question. Preferably the valves are three way valves, however a suitable combination of two way valves may be applied alternatively. A heater and a cooler can be in fluid connection with the tree way valves in such an arrangement, that heat transfer fluid can be pumped around in four modes of operation, depending on the settings of the three way valves. These four modes comprise a first mode wherein a single loop is arranged of heat transfer fluid through the heater, the first cell or cluster, the cooler, the second cell or cluster and returning back in the heater again. A second mode comprises two separated shortcut circuits, one in which heat transfer fluid flows from the heater to the first cell or cluster and returning to the heater again and one in which the heat transfer fluid flows from the cooler to the second cell or cluster and returns back to the cooler again. A third mode comprises again one loop or circuit, now the heat transfer fluid flows from the heater in the second cell or cluster, the cooler, the first cell or cluster and back again in the heater. Finally a fourth mode comprises again two separated loops, now one loop connecting the heater with the second cell or cluster in a closed loop and a further loop connecting the cooler with the first cell or cluster.

A further aspect of the invention is an adsorption compressor comprising at least two cells or clusters of cells of adsorption material, surrounded by and in heat transfer connection with a heat transfer fluid channel, the clusters each comprising cross-connectors at their heat transfer fluid entrances and exits, wherein a first branch of each of the cross connectors of each cell or cluster of cells is in fluid connection with a first or a second three way valve, such that the cross-connectors of each of both cells or clusters of cells is in fluid connection with a different three way valve, and wherein the remaining two branches of the cross-connectors each are in fluid connection to a manifold.

Due to this specific arrangement of a Cross-connector close to the cells or clusters, only a very limited section of heat transfer fluid conduits is confronted with cold, hot and intermediately warm heat transfer fluid. The smaller this section is, the less mixing losses between hot and cold fluid occurs, such that these mixing losses are minimised.

A further aspect of the invention is a method of operating an adsorption compressor, comprising two adsorption clusters as described hereinabove, wherein hot and cold heat transfer fluid is pumped through the heat transfer channel in such a way that over the length of the cell or the cluster a substantially continuously moving thermal wave is generated.

A further aspect of the inventions is a heat pump, wherein in the refrigerant loop a branch off with a buffer container is arranged, which is provided with adsorbing material and a temperature controller. In such a system, by controlling the temperature of the buffer, the amount of adsorbed refrigerant can be controlled, such that the available refrigerant for cooling operations can be controlled. By reducing the amount of refrigerant, the condensing and or the evaporation pressures in respectively the condenser and evaporator can be controlled. These pressures relate to the temperatures of operation of the condenser and the evaporator.

Thus an elegant way of adjusting e.g. the cooling temperature is provided, such that an on-off mode of the heat pump can be avoided, providing e.g. more accurate, constant cooling temperatures. Although this temperature controlled adsorption buffer can be practical in the heat pumps as described herein, it may even so be practically used in existing heat pumps.

In order to further elucidate the invention, exemplary embodiments will be described with reference to the drawings. In the drawings:

FIG. 3 represents a schematic perspective view of a cell cluster according to a further embodiment of the invention;

FIG. 4 represents a schematic perspective view of a spider connector according to a further embodiment of the invention;

FIG. 5 represents a schematic side view of a cluster according to FIG. 3;

Figure 12:
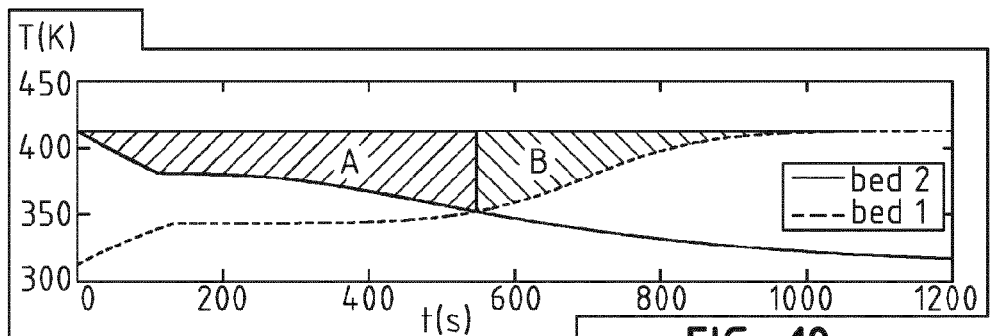
Figure 13:
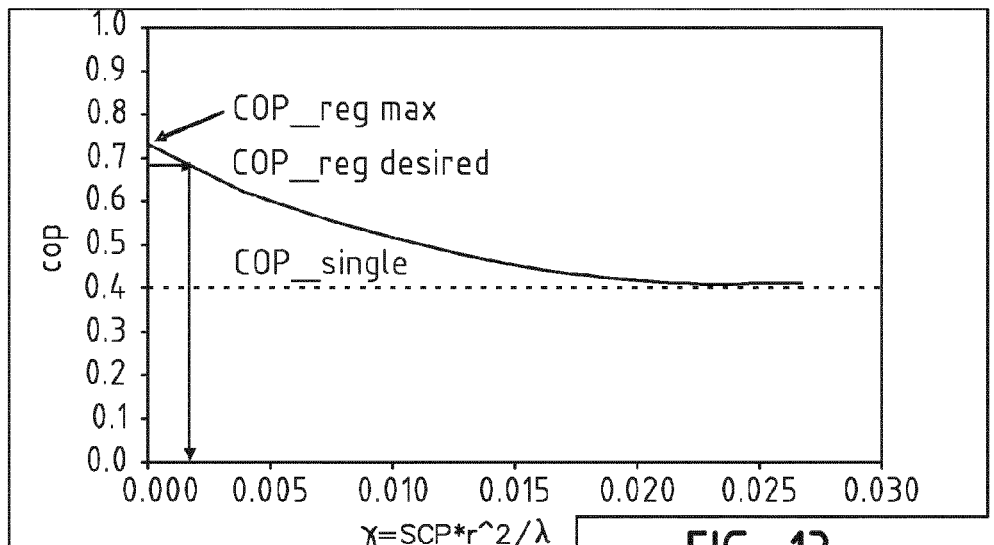
Figure 14:
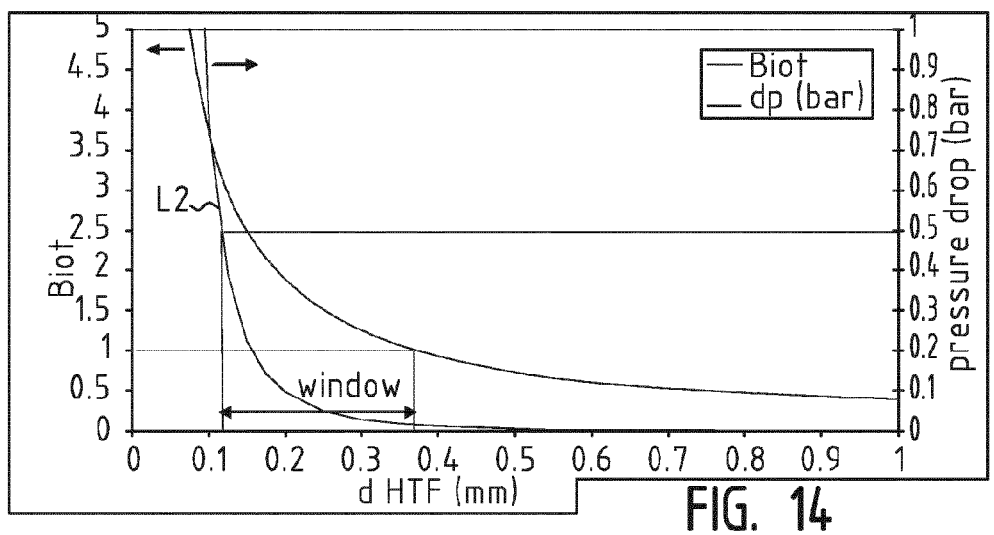
Figure 19:
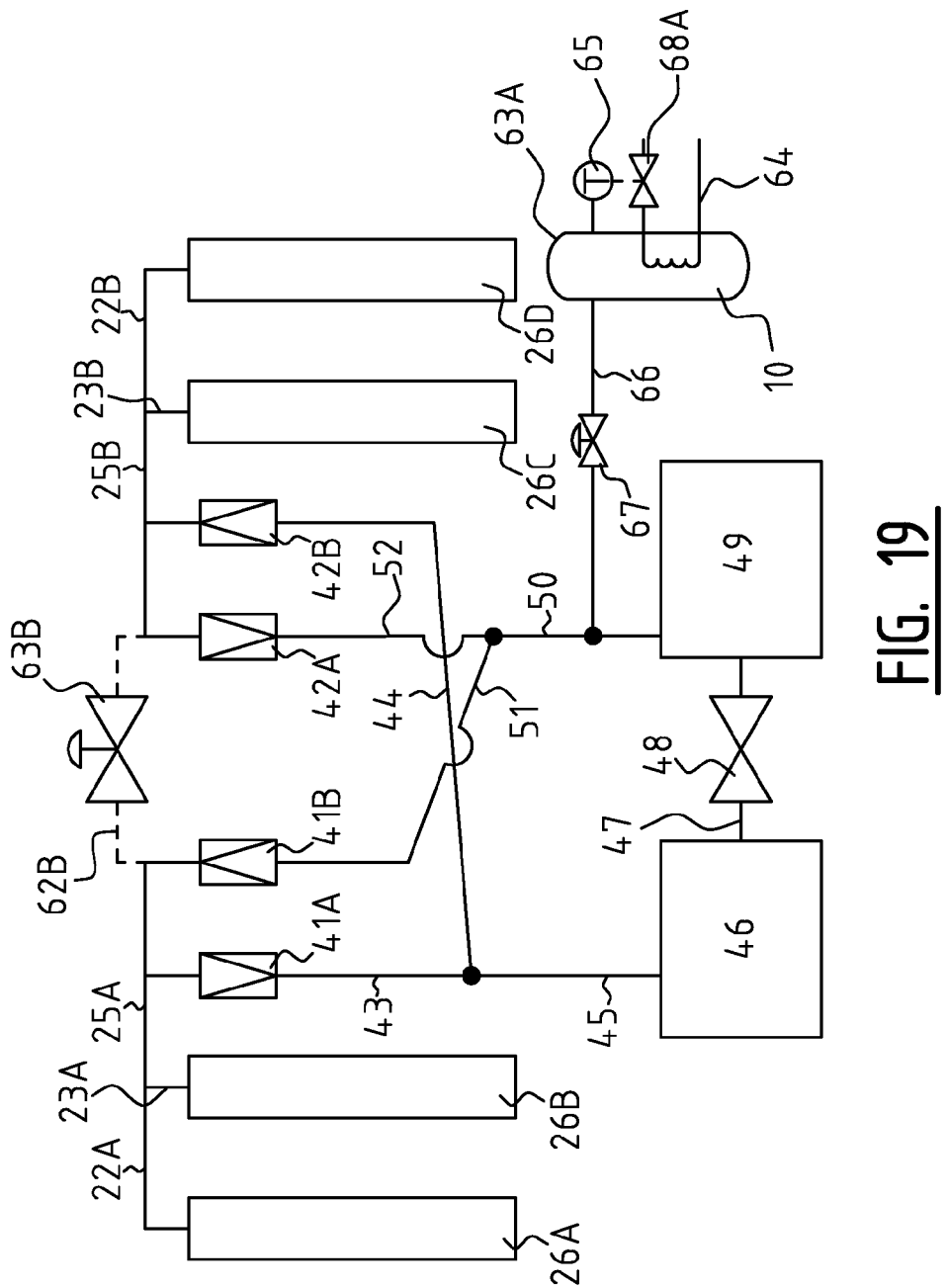
Figure 22A:
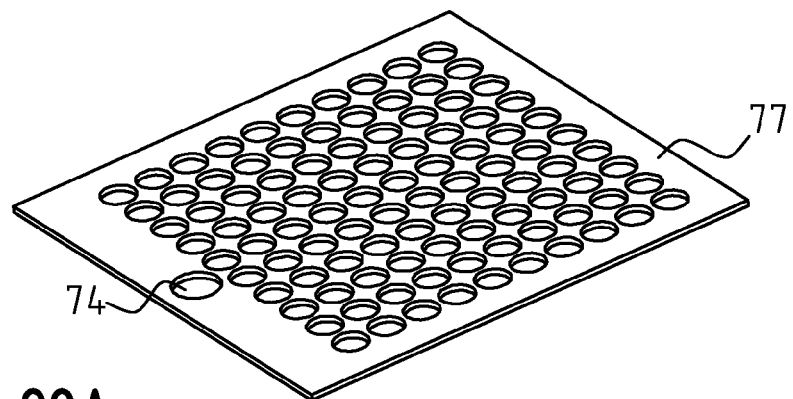
Figure 22B:
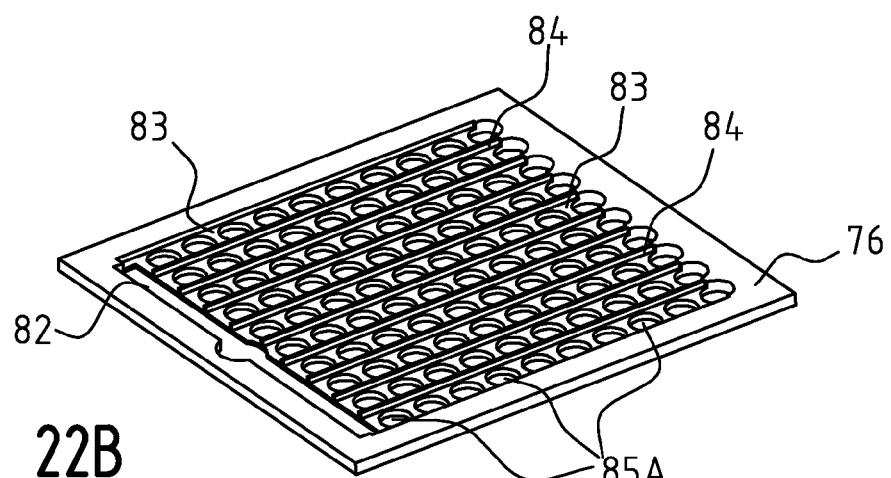
Figure 22C:
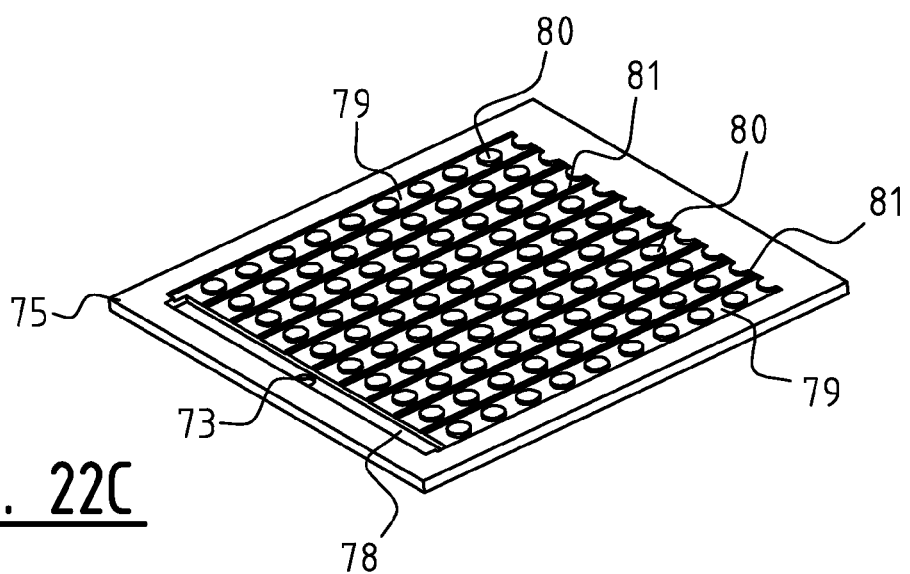
Figure 24:
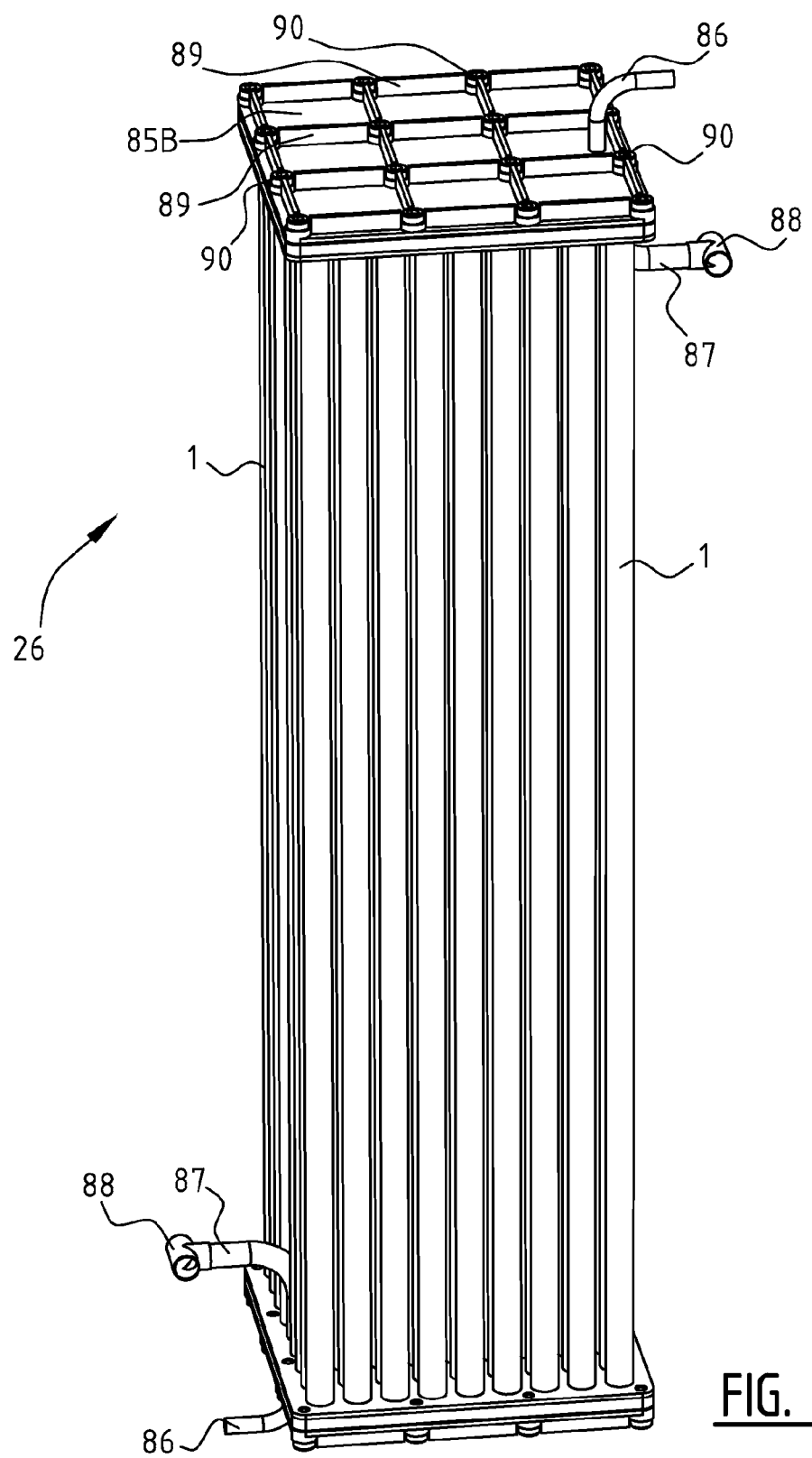
Figure 25D:
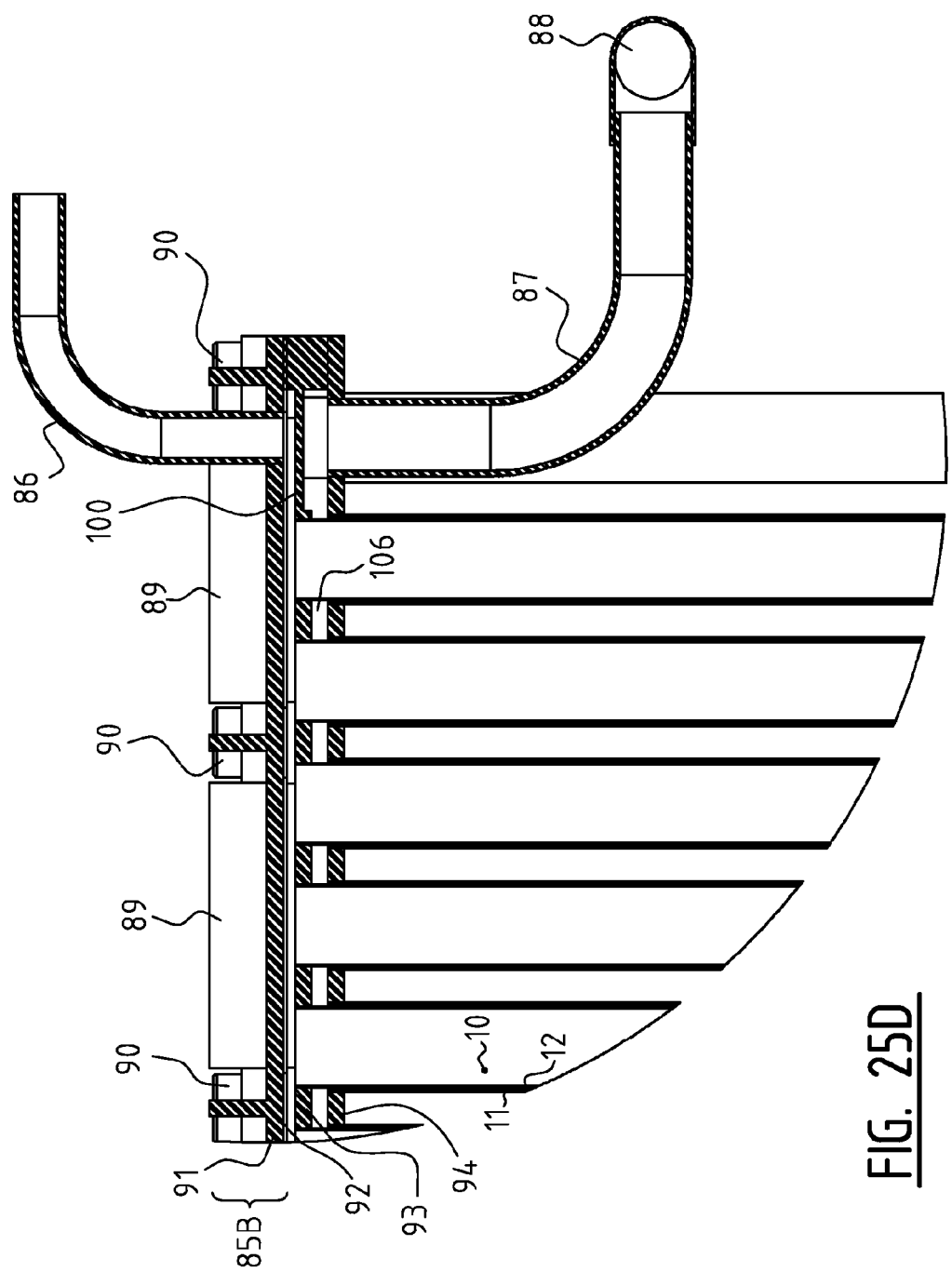
Figure 26A:
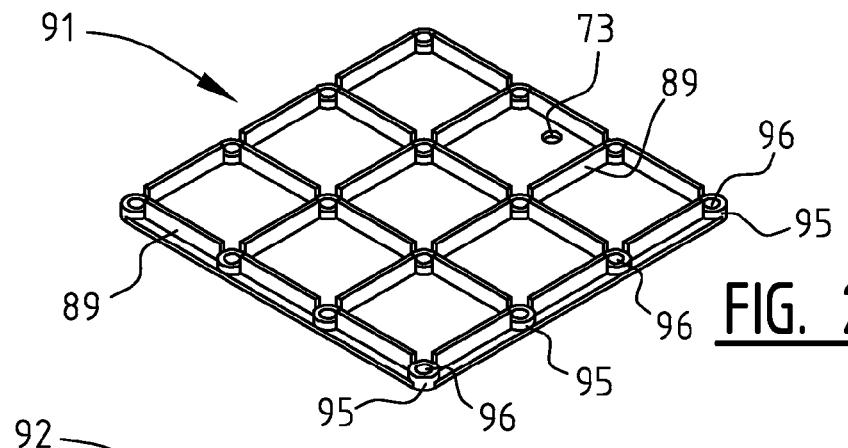
Figure 26B:
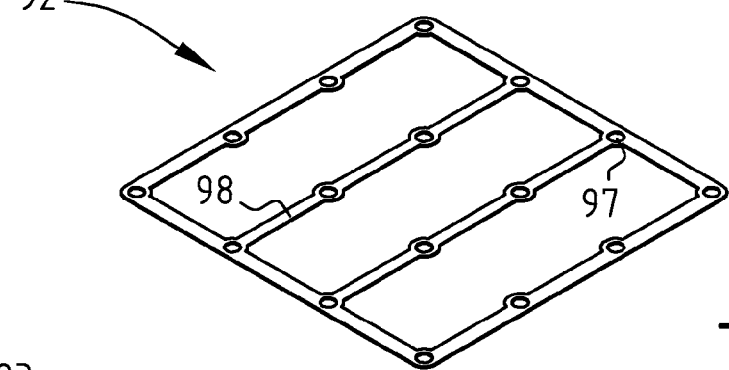
Figure 26C:
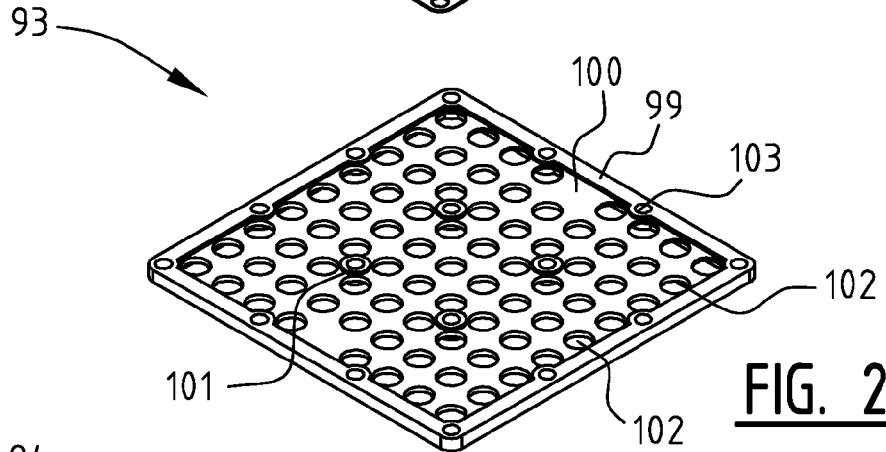
Figure 26D:
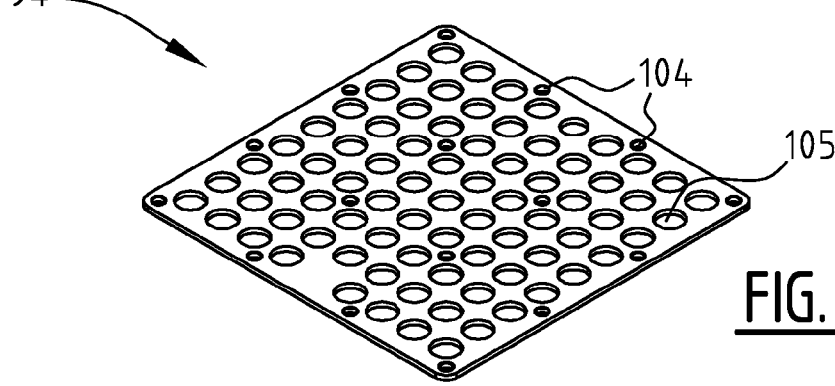
Figure 28:
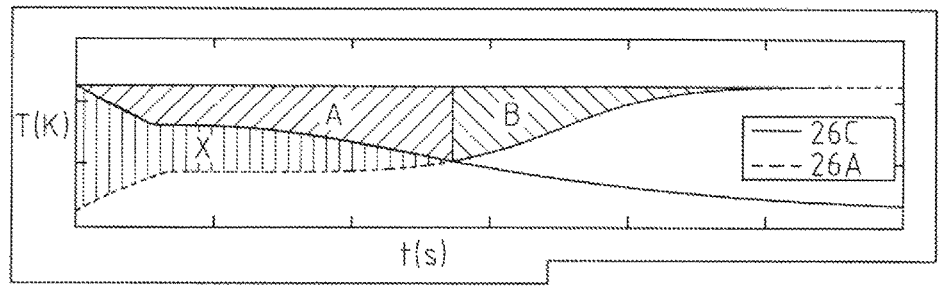
Figure 29A:
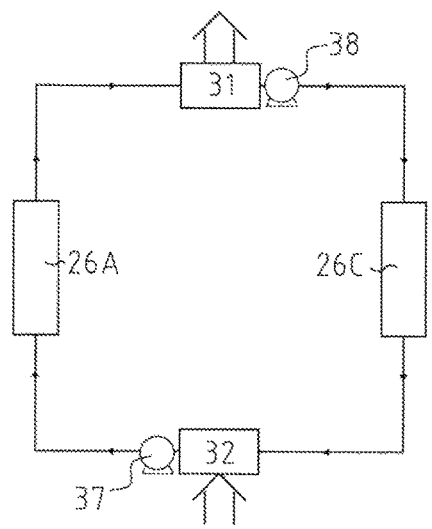
Figure 29B:
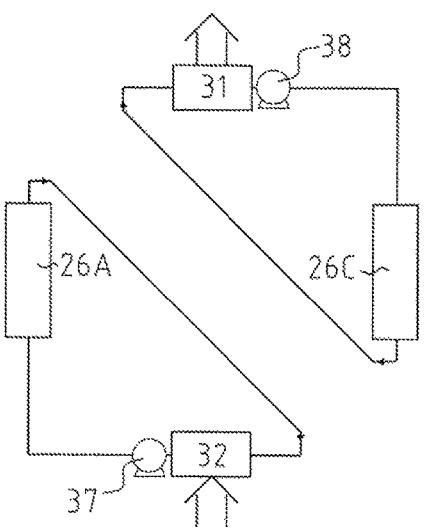
Figure 29C:
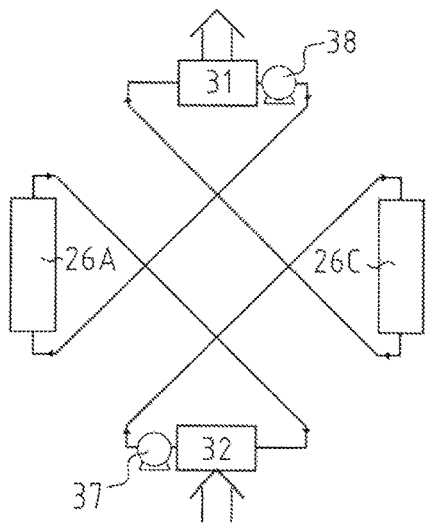
Figure 29D:
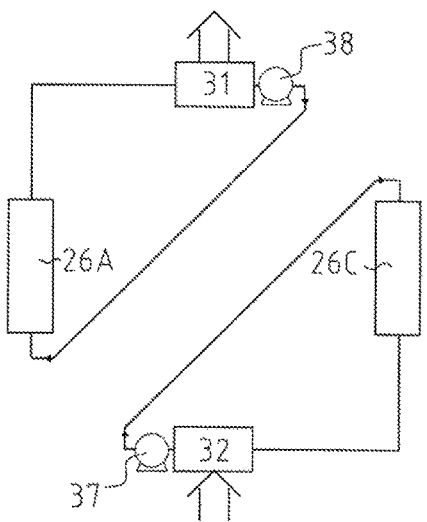
Figure 30A:
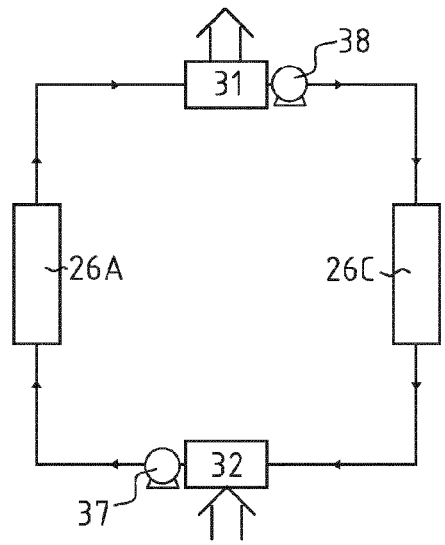
Figure 30B:
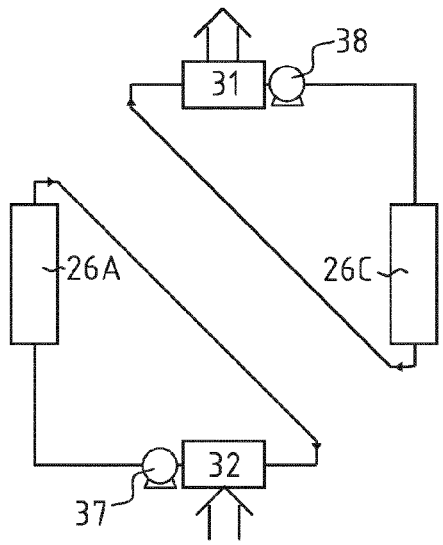
Figure 30C:
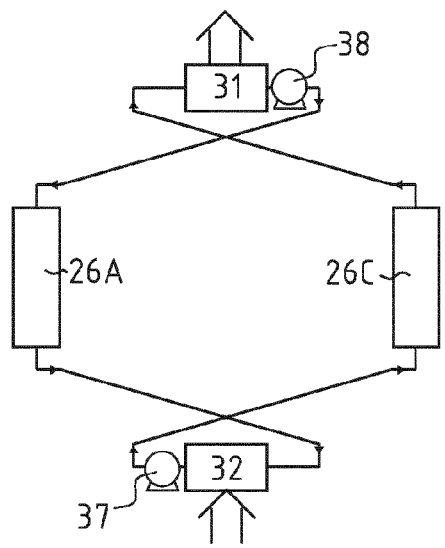
Figure 30D:
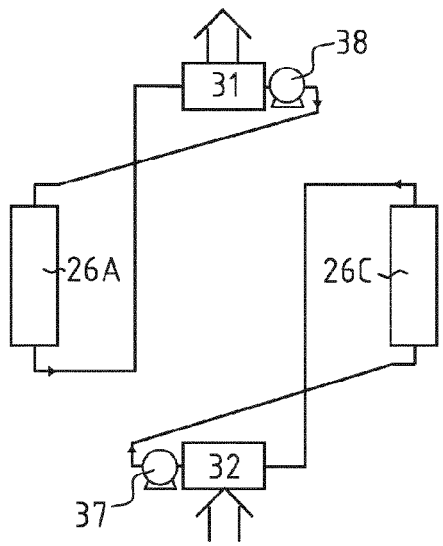
Figure 32A:
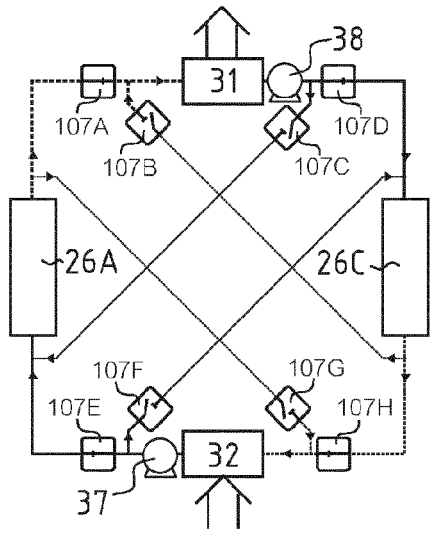
Figure 32B:
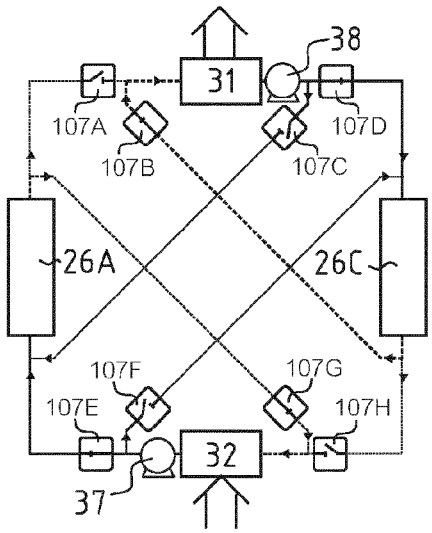
Figure 32C:
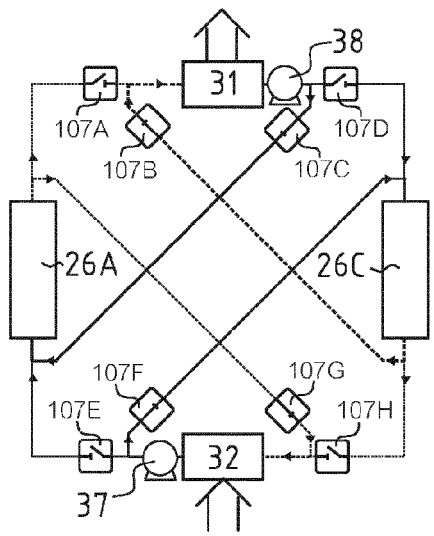
Figure 32D:
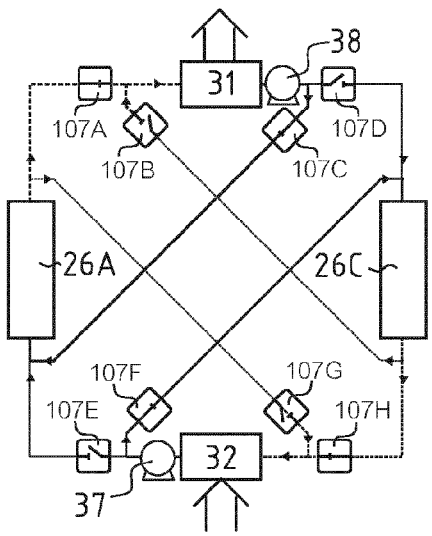
Figure 33A:
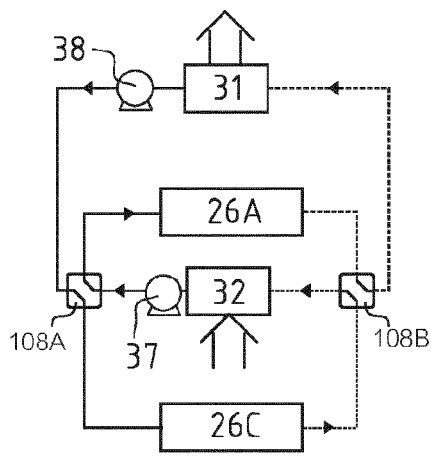
Figure 33B:
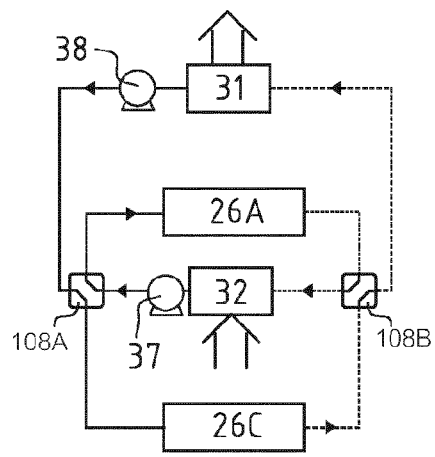
Figure 33C:
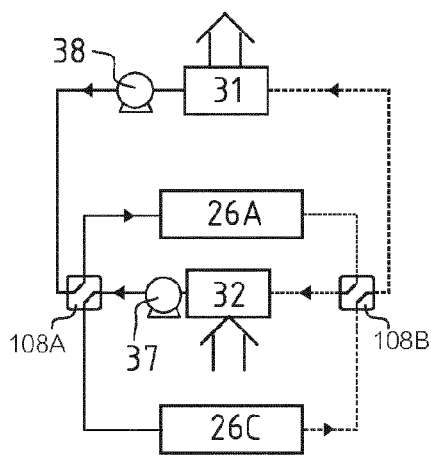
Figure 33D:
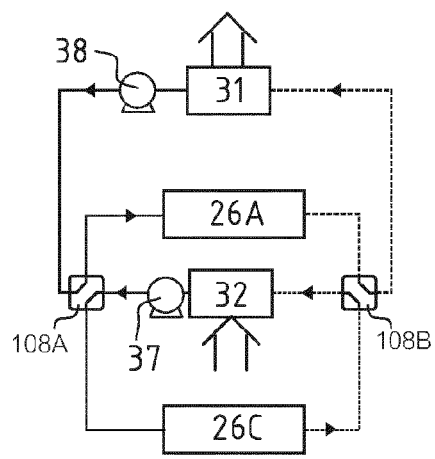

FIG. 10A-I represent a schematic process flow diagram of the heat transfer fluid flow in a further alternative embodiment of the invention;

FIG. 11A-D represent a schematic process flow diagram of the heat transfer fluid flow in a further alternative embodiment of the invention;

FIG. 12 represents a schematic temperature profile at the exits of two adsorption bed clusters according to the invention;

FIG. 13 represents a typical relation between COP and SCP according to the invention;

FIG. 14 represents a combined graph depicting equations 3 and 9 in a combined plot according to the invention;

FIG. 15 represents a cross sectional view of an alternative embodiment of a heat fluid channel according to the invention;

FIG. 16 represents a cross sectional view of a further alternative embodiment of the geometry of the adsorption material and the heat transfer fluid channels according to the invention;

FIG. 17 represents a cross sectional view of a further alternative embodiment of the geometry of the adsorption material and the heat transfer fluid channels according to the invention;

FIG. 18A represents a schematic perspective view of a further alternative embodiment of the geometry of the adsorption material and the heat transfer fluid channels according to the invention;

FIG. 18B represents a schematic perspective view of an embodiment of the adsorption material according to the invention;

FIG. 19 represent a schematic view of an alternative embodiment of the refrigerant flow diagram according to the invention;

FIG. 20 represents a schematic perspective view of an alternative embodiment of an adsorption cell cluster according to the invention;

FIG. 21A represents a schematic top view of the cluster according to FIG. 20;

FIG. 21B represents a schematic side view of the cluster according to FIG. 20;

FIG. 21C represents a schematic front view of the cluster according to FIG. 20;

FIG. 21D represents a schematic cross sectional view through line A-A of the cluster according to FIG. 20;

FIG. 21E represents a schematic detailed cut out view of FIG. 21 D;

FIG. 22A-C represent a schematic perspective exploded view of a distribution element of FIG. 21F;

FIG. 23A represent a schematic perspective partly cut open view of the cluster according to FIG. 20;

FIG. 23B represents a schematic perspective detailed view of FIG. 23A;

FIG. 24 represents a further alternative embodiment of an adsorption cell cluster according to the invention;

FIG. 25A represents a schematic top view of the cluster according to FIG. 24;

FIG. 25B represents a schematic front view of the cluster according to FIG. 24;

FIG. 25C represents a schematic cross sectional view through line A-A of the cluster according to FIG. 25B;

FIG. 25D represents a schematic detailed cut out view of FIG. 25C;

FIG. 26A-D represent a schematic perspective exploded view of a distribution element of the cluster according to FIG. 24;

FIG. 27A represents a schematic perspective cut open view of the cluster according to FIG. 24;

FIG. 27B represents a schematic detailed cut out view of the cluster of FIG. 27A;

FIG. 28 represents a schematic temperature profile at the exits of two adsorption bed clusters according to the invention;

FIG. 29A-29D are illustrations of the principles underlying the method of the present invention showing a schematic process flow diagram of the heat transfer fluid flow;

FIG. 30 represents a schematic process flow diagram of the heat transfer fluid flow;

FIG. 31A-B represent a schematic process flow diagram of the heat transfer fluid flow in a further alternative embodiment of the invention;

FIG. 32A-D represent a schematic process flow diagram of the heat transfer fluid flow in a further alternative embodiment of the invention.

FIG. 33A-D represent a schematic process flow diagram of the heat transfer fluid flow in a further alternative embodiment of the invention;

FIG. 34 represents a cross sectional view of a further alternative embodiment of the geometry of the adsorption material and the heat transfer fluid channels according to the invention;

FIG. 35 represents a schematic perspective view of an embodiment of the adsorption material according to the invention;

FIG. 36 represents the measured temperature profile at the inlets and outlets of two adsorption bed clusters according to the invention.

The expression "effective thermal conductivity" used herein is to be understood as, though not to be considered limited to the thermal conductivity [W/mK] in the dominant heat transfer direction. E.g. for the adsorbents, this is in the coaxially arranged tube design, the conductivity in the radial direction. This thermal conductivity can be enhanced by heat conducting platelets as is proposed in FIG. 18.

In the heat transfer fluid, similar to the coaxial tube design, this is the thermal conductivity in the radial sense. When a corrugated conductive material is placed within the heat transfer fluid channel, the dominant heat transfer direction will be in a tangentially sense, i.e. substantially perpendicular to the meanders of the corrugated plate.

The expression "characteristic dimension" used herein is to be understood as, though not to be considered limited to the relevant height, width, diameter, (equivalent) radius or thickness [m] of the adsorption material or of the fluid transfer channel taken in the direction of the dominant heat transfer. E.g. in the coaxial tube design, the characteristic dimension of the adsorption material is its (equivalent) radius, the characteristic dimension of the heat transfer channel is its width or height. In the case of a stacked plate design, wherein plates of adsorbents are sandwiched between heat transfer fluid channels, the characteristic dimension is half the height of the adsorbents material, since heat transfer occurs substantially symmetrically to both surfaces of the adsorption material layer. In that case this also applies for the heat transfer fluid channel, wherein the characteristic dimension is half the height of the heat transfer fluid channel.

Yet again in the heat transfer fluid channel, in which a corrugated conductive element is applied, as is shown in FIG. 15, the characteristic dimension is half the width between two succeeding meanders of the corrugated conductive element.

The expression "Specific cooling power" used herein is to be understood as, though not to be considered limited to the thermal cooling power divided by the mass of the adsorption compressor [W/kg]

The quantity "γ" used herein can be understood as, though is not to be considered limited to a design parameter reflecting the maximum temperature difference within the thermal wave in the direction of the dominant heat transfer over the adsorption material divided by the density of the adsorption material. The quantity "γ" is defined as presented in equation 10 herein below.

The expression "base side of a three way valve" used herein can be understood as, though is not to be considered limited to a connection side of a three way valve, which can, by switching the valve, be connected with either a first or a second switching side of the three way valve, such that either a fluid connection is obtained between the base side and on of the two switching sides. The expression elongated used in this specification and in the claims is to be understood as, though not to be considered limited to an property of a physical entity of which one dimension, e.g. measurement or size in a first dimension is far greater than the measurement or size in the other two dimensions. In general at least one dimension departing by at least a factor 2 from the other two could for instance be recognised as being elongated.

The figures represent exemplary embodiments of the invention and should not be considered limiting the invention in any way or form. Throughout the description and the figures the same or corresponding reference numbers are used for the same or corresponding elements.

Figure 1:
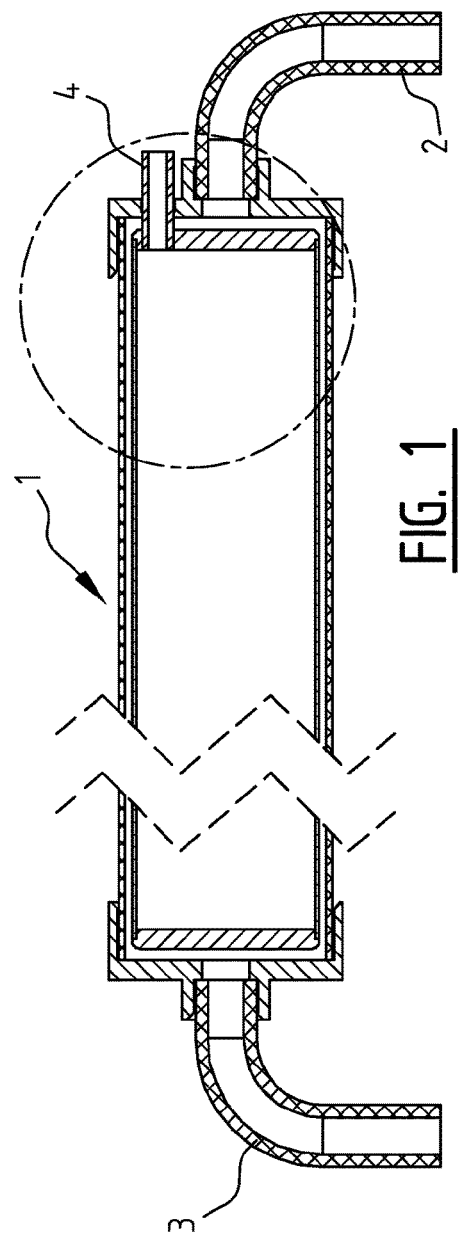
FIG. 1 represents a schematic cross sectional side view of an adsorption cell according to a first embodiment of the invention.

In FIG. 1 a schematic cross sectional side view of an adsorption cell according to the invention is depicted. In this adsorption cell, which can be seen in FIG. 2 in more detail, a first heat transfer fluid connector 2 and a second heat transfer fluid connector 3 are in fluid connection with a annular heat transfer fluid channel 2a by means of caps 5. The cap 5 is provided with a first connector 6 for connection to the heat transfer fluid connection conduit and a skirt 7 for connecting the cap on the cylindrical wall 11. The cylindrical wall 11 forms the outer shell of the adsorption cell and the outer shell of the heat transfer fluid channel 2a. In the tubular outer shell 11, a inner shell 12 is coaxially arranged. This inner shell forms the inner tubular wall of the heat transfer channel 2a. Inside the inner tubular wall 12 a bed of solid adsorption material 10 is arranged. The inner tubular wall 12 is kept by the caps 8 of which one is provided with a vapor connector 4. The annular heat transfer channel 2a is chosen to be of small dimensions, wherein the cap space between the outer and the inner tubular wall is in the range of 1 mm or less. The inner diameter of the inner wall 12 with the solid adsorption material can be chosen to be less than 2 cm, like e.g. less than approximately 1.5 cm. Inside the adsorption material, a vapor passage channel can be arranged. This channel can be coaxially arranged with the outer and inner tubular walls 11 and 12 resspectively.

In order to position the inner wall 12 precisely, the annular channel 2a can be provided with spacers. These spacers can for instance be obtained by well defined impressions in the outer tubular shell 11, forming studs that hold the inner tubular wall in position.

Figure 2:
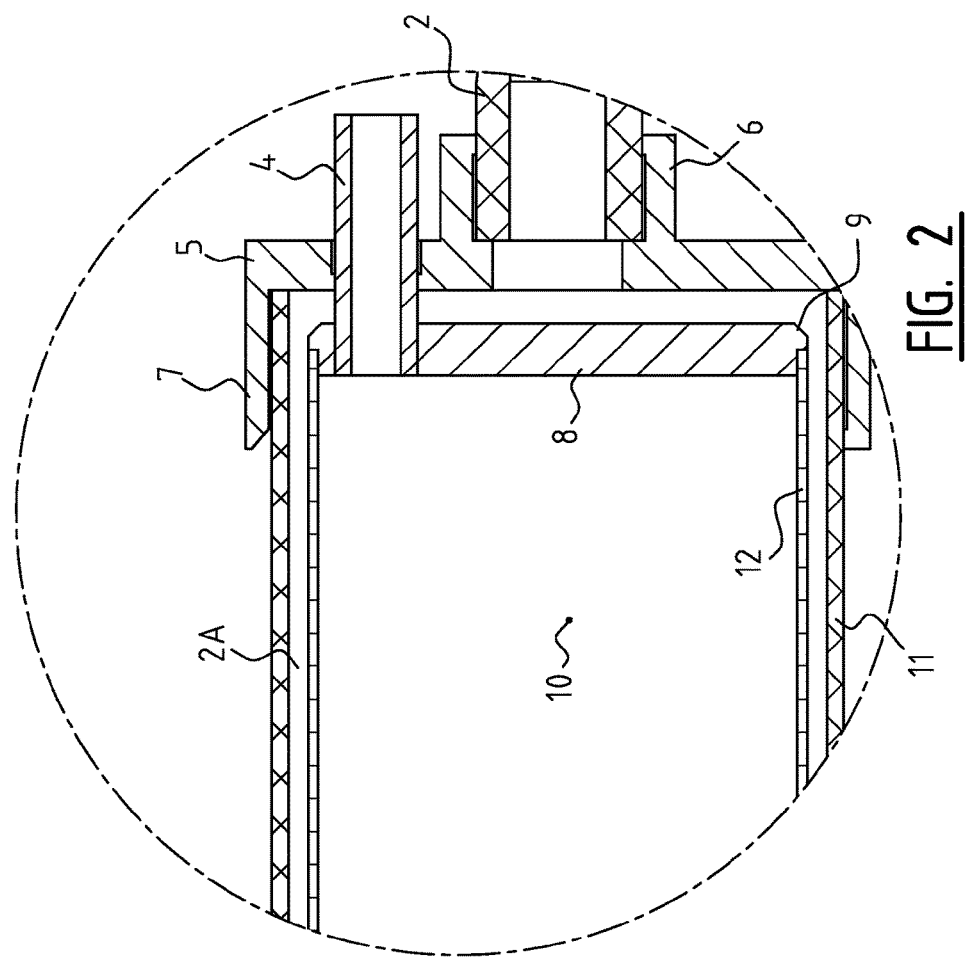
FIG. 2 represents a cut out detail of the cross sectional side view of FIG. 1.

FIG. 3 depicts a cluster of adsorption cells as described and shown in FIGS. 1 and 2. In the embodiment of FIG. 3, eight cells are arranged in a cluster, wherein the heat transfer fluid connectors are connected to a distribution connector 13, which can be a spider shaped connector with symmetrical legs, which on its turn is connected to a T-connector 16. The vapor conduits 4 are at one side connected to the adsorption material inside the inner cylindrical wall 12 of the adsorption cells 1 and at the other side to the vapor conduit connectors 17, connecting the vapor conduits 4 through a set of check valves to either the evaporator or the condenser of the heat pump.

FIG. 4 depicts a detailed view of the spider shaped distribution connector 13.

FIG. 5 represents a schematic side view of the adsorption cell cluster according to FIG. 3. In FIG. 5 it can be seen that on both ends of the elongated cluster of elongated adsorption cells heat transfer connectors are arranged connecting the annular heat transfer channels of each of the adsorption cells by means of the spider connector 15 to the T-heater connection 16. The vapor conduits on the other hand are in this embodiment only connected to one of the sides of the elongated cell cluster. The vapor conduits may alternatively also be positioned at both ends of the elongated adsorption cells, since it can be favourable to have the vapor entering or exiting guided either along the relative hot or the relative cold side.

Figure 6A:
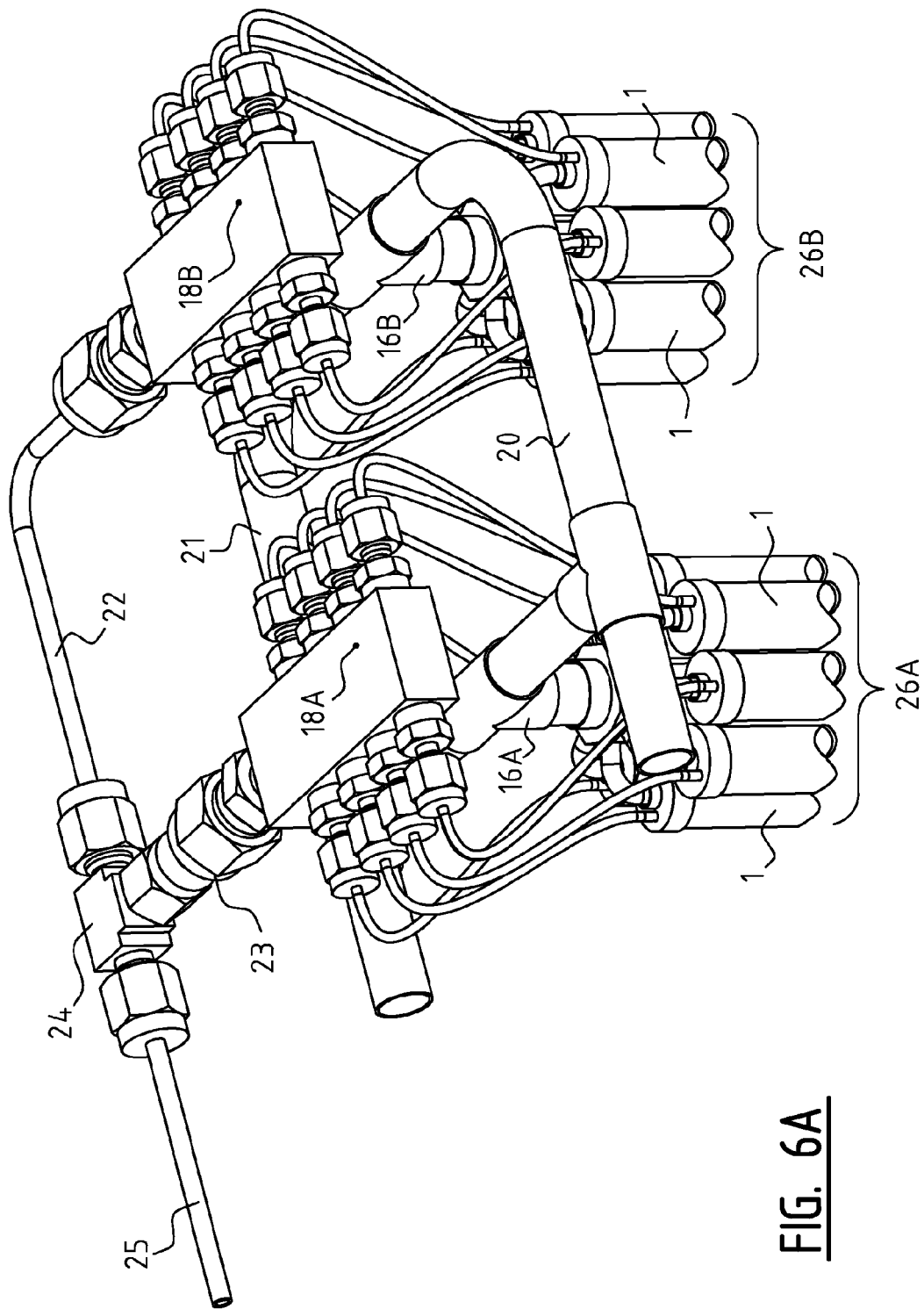
FIG. 6A represents a schematic perspective view of a cluster of adsorption cells with connection headers or manifolds according to a further embodiment of the invention.

FIG. 6A depicts an arrangement of two adsorption cell clusters in a schematic perspective view. The first adsorption cell cluster 26a is connected by means of the heat transfer T-connector 16a to a heat transfer inlet manifold (or header) 20 and to a heat transfer outlet manifold 21. The vapor manifold manifolds 18a and 18b are connected to the vapor manifold 25 through connectors 23 and 22 respectively. Both the conduits 23 and 22 are connected to the T-connector 24, which connects these conduits to the vapor manifold 25.

Figure 7:
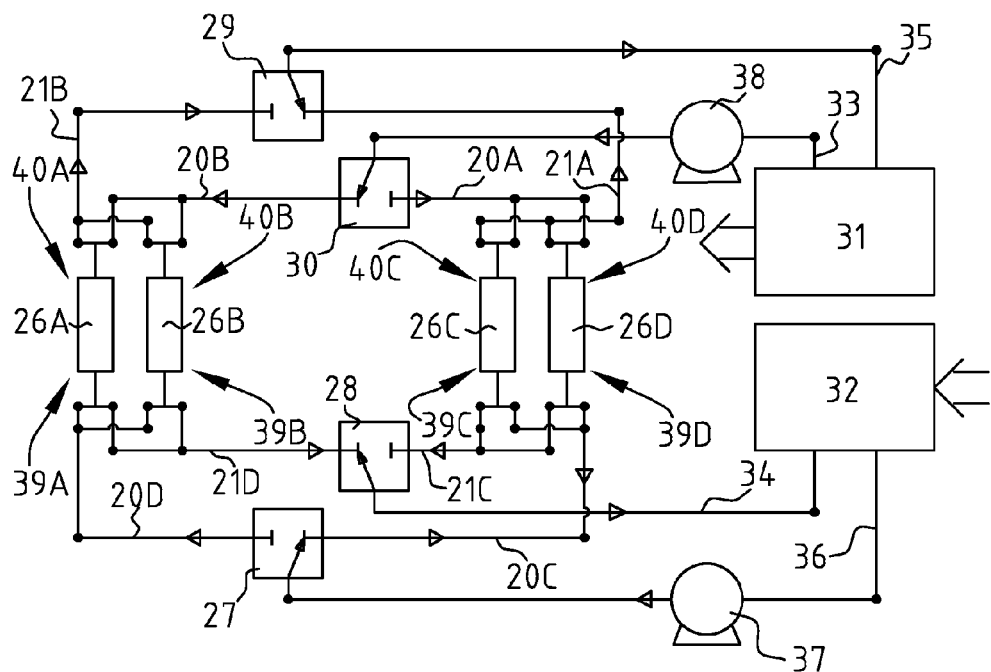
FIG. 7 represents a schematic process flow diagram of the heat transfer fluid flows in a compressor according to a further embodiment of the invention in a first mode of operation.

In FIG. 7, a schematic process flow diagram is depicted of the heat transfer fluid circulation through the adsorption cell clusters 26a, 26b, 26c and 26d in a first mode of operation. In order to better elucidate the invention, the vapor flow conduits are left out. It is to be noted, however, that each of the adsorption cell clusters 26a, 26b, 26c and 26d, is connected by means of vapor conduits and through a set of check valves to a condenser, a pressure release valve and an evaporator. Such arrangement can be found in heat pumps and refrigerators (see for further details FIG. 9).

In FIG. 7, a heater or heat exchanger 32 is arranged to an outlet conduit 34 feeding the heater or heat exchanger 32 with a relative hot heat transfer fluid, originating from the hot sides 39A and 39B of the reheated adsorption clusters 26A and 26B respectively or from the hot sides 39C and 39D of the reheated adsorption cell clusters 26C and 26D respectively, during their respective cooling modes. The heater or heat exchanger 32 is further connected to an inlet conduit 36 for guiding reheated heat transfer fluid to either the hot side 39A and 39B of adsorption cell clusters 26A and 26B respectively or the hot side 39C and 39D of the adsorption cell clusters 26C and 26D respectively during their respective heating mode.

The heater or heat exchanger 32 can for instance be a gas fired heater or a heat exchanger that is fed by a normal auxiliary heat transfer fluid, originating e.g. from a solar-thermal system. In FIG. 7, the adsorption cell clusters 26A and 26B are in the mode of cooling down, whereas the adsorption cell clusters 26C and 26D are in a mode of heating up. The hot heat transfer fluid exiting the heater or heat exchanger 32 is guided by the three-way valve 27 through the inlet manifold 20c to the adsorption cell clusters 26c and 26d. During this mode, the adsorption material is heated up in a specific way, with a rather steep temperature profile or front that is at the start of this mode close to the hot ends 39C and 39D. During the influx of hot heat transfer fluid at the hot end of the adsorption cell clusters, the temperature profile or front, also indicated as thermal wave, see U.S. Pat. No. 4,610,148 is pushed through the individual cells until it reaches the cold sides 40C and 40D of the adsorption cell clusters 26C and 26D respectively.

During the influx of the hot heat transfer fluid in the heat transfer channels 2A of the adsorption cell clusters 26C and 26D, due to the rather steep temperature profile, relative cold heat transfer fluid is exiting the cold sides 40C and 40D of the adsorptions cell clusters 26C and 26D. The relative cold heat transfer fluid is forced through the outlet manifold 21A, through the three way valve 29 and through the outlet conduit 38 to the cooler or heat exchanger 31.

Although the heat transfer fluid originating from the adsorption cell clusters 26C and 26D is relatively cold, it needs to be further cooled in order to re-cool the adsorption cell clusters 26A and 26C.

Figure 8:
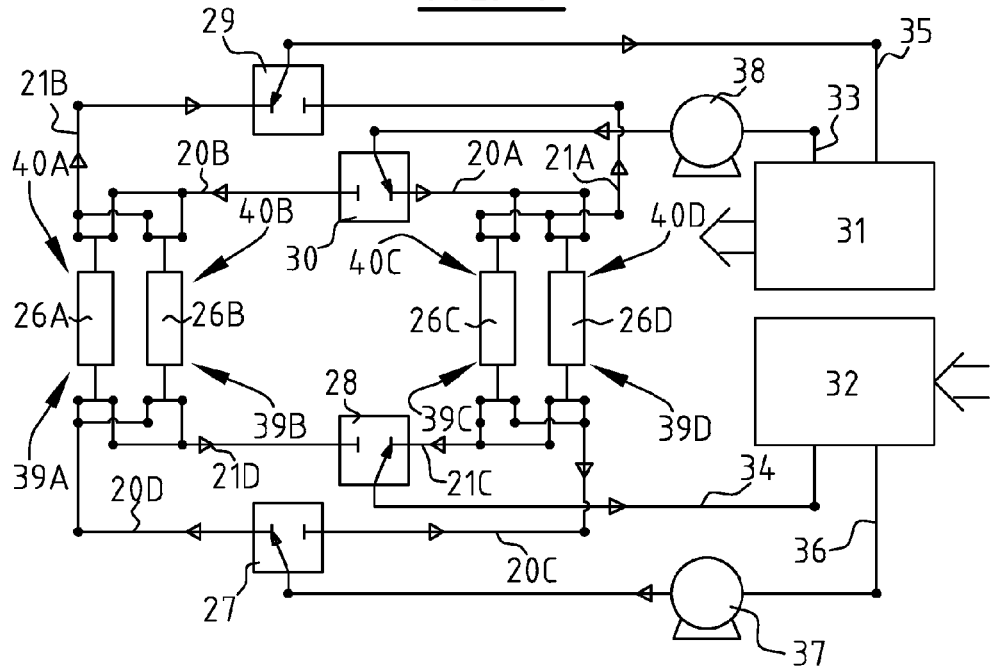
FIG. 8 represents the flow diagram of FIG. 7 in a second mode of operation.

By the application of the heat transfer fluid T-connectors 16 in combination with the three way valves 27-30, only very limited amounts of heat is lost by mixing up cold and warm portions of heat transfer fluid. Each time, one arm of the T-connectors 16 and the thereto connected manifolds are switched in function, while the other arm and the thereto connected relevant manifolds are connected to a dead end conduit and thus idle. Thus in mode 1, according to FIG. 7, the outlet manifolds 21B and 21C are closed off, as well as the inlet manifolds 20A and 20D. Thus in mode 2, as represented by FIG. 8, the outlet manifolds 21A and 21D are closed off, as well as the inlet manifolds 20C and 20B. Since all the conduits 33-36, manifolds 20A-D and 21A-C including the T-connectors 16 and the three way valves 27-30 are properly heat isolated, heat losses are reduced to a minimum.

When the temperature profile or front reaches the cold sides 40C and 40D, a heat detector (not shown) will provide a signal to a controller (not shown), which can turn the four three way valves 27,28,29 and 30 to switch. By switching the three way valves 27-30, the system instantaneously switches in the second mode.

In the second mode, as shown in FIG. 8, the adsorption cell clusters 26C and 26D are in the mode of cooling down, whereas the adsorption cell clusters 26A and 26B are in a mode of heating up. The hot heat transfer fluid exiting the heater or heat exchanger 32 is now guided by the three-way valve 27 through the inlet manifold 20D to the adsorption cell clusters 26A and 26B. During this mode, the adsorption material is heated up in a the same way as the adsorptions cell clusters were in mode 1, with a rather steep temperature profile or front that is at the start of this mode close to the hot ends 39A and 39B. During the influx of hot heat transfer fluid at the hot end of the adsorption cell clusters 26A and 26B, the temperature profile or front, also indicated as temperature wave, see U.S. Pat. No. 4,610,148 is pushed through the individual cells until it reaches the cold sides 40A and 40B of the adsorption cell clusters 26A and 26B respectively.

During the influx of the hot heat transfer fluid in the heat transfer channels 12A of the adsorption cell clusters 26A and 26B, due to the rather steep temperature profile, relative cold heat transfer fluid is exiting the cold sides 40A and 40B of the adsorptions cell clusters 26A and 26B. When the temperature profile or front reaches the cold sides 40A and 40B, a heat detector (not shown) can provide a signal to a controller (not shown), which can turn the four three way valves 27,28,29 and 30 to switch. By switching the three way valves 27-30, the system instantaneously switches back in the first mode, such that the cycle can start anew.

The heat exchanger or cooler 31 cools down the portion of the heat transfer fluid used for cooling the adsorption beds. The hot heat transfer fluid in the inlet of the adsorption cell clusters 26c and 26d will be guided through the annular walls of the individual adsorption cells within the clusters 26c and 26d and will gradually heat up the adsorption material inside the inner walls 11 of the individual adsorption cells. Each of the arms of the T-connectors of the hot sides of the clusters are in fluid connection with a switching side of a first pair of three way valves, in such a way that the different arms of each individual T-connector is in fluid connection with the switching side of a different three way valve.

By heating up the adsorption material, the adsorbed vapor will be gradually released from the adsorption material. In the length wise direction of the individual adsorption cells a front of hot heat transfer fluid will slowly expel the cold heat exchanger fluid through the annular heat transfer channels within the individual cells towards the outlet manifold 21a. This outlet manifold is connected to the heat transfer fluid three-way connection valve 29 towards the cooler/heat exchanger 31.

Figure 9:
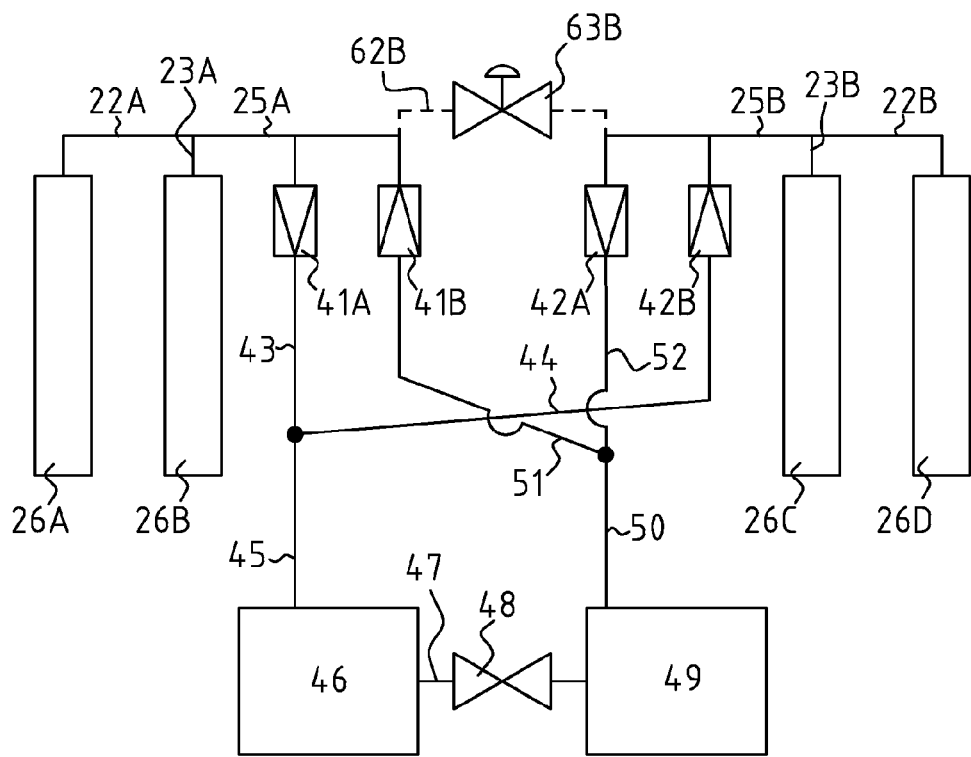
FIG. 9 represents a schematic process flow diagram of a heat pump comprising an adsorption compressor according to an embodiment of the invention.

In FIG. 9 a schematic representation of the tube side of the adsorber cells or clusters and the adsorbed refrigerant flow diagram is depicted. The tube sides of the clusters of adsorption cells 26A-D are via manifolds 25A and 25B and through a set of check valves 41A, 41B and 42A, 42B connected to condenser 46 and an evaporator 49. The condenser 46 is via conduit 47 and expansion valve 48 connected to the evaporator 49.

During heating of the clusters of adsorption cells 26A and 26B, the refrigerant gas is at relative high pressure forced out of the adsorption material and will be guided by check valve 41A and 41B towards condenser 46. In condenser 46, heat is removed from the high pressure gas such that is condenses to a liquid. After exiting the condenser, the liquefied gas is chocked over expansion valve 46, where the temperature and pressure of the gas drops considerably. At low pressure, the condensed gas will start to boil in the evaporator 49, collecting heat from its surroundings in order to re-evaporate the gas. The low pressure refrigerant gas exiting the evaporator 49 will be guided through check valves 42A and 42B to that adsorber that is in its cooling mode, collecting and adsorbing the gas.

Although not shown, in order to further enhance the efficiency of the system, a counter flow heat exchanger may be integrated in the conduits 45 and 50. Thus the relative warm coolant in conduit 45 can be cooled by the relative cold refrigerant from conduit 50 before it is condensed in condenser 46.

The flow diagrams of FIGS. 7, 8 and 9 are in practice combined, such that with the combined installation by means of an abundant relative low caloric heat source, a relative high thermal cooling action can be performed substantially without mechanical equipment other than a series of valves and check valves.

In an alternative embodiment, when the temperature profile seen along the length of the clusters 26A-D or cells 1 is relative flattened (as a result of axial dispersion), the trigger to switch flow, either switching to cooling down or switching to heating up may happen too soon for an efficient operation of the adsorber cells. Thus the Coefficient of Performance may be too low for economical service. In order to maximize the use of the heat of the heat transfer fluid, shortcuts may be integrated in both the hot and cold portions of the cycles. The clusters 26A, 26B or 26C and 26D to be cooled can be connected to the cooler 31 and the clusters 26C and 26D or 26A and 26B to be heated can be connected to the heat exchanger or heater 32. Thus substantially four modes of operation are possible. This can be performed in two ways, firstly by maintaining the flow directions in the shell sides of the clusters 26A-D or the cells 1 and secondly by switching the direction of flow when switching from cooling to heating and vice versa.

Figure 10A:
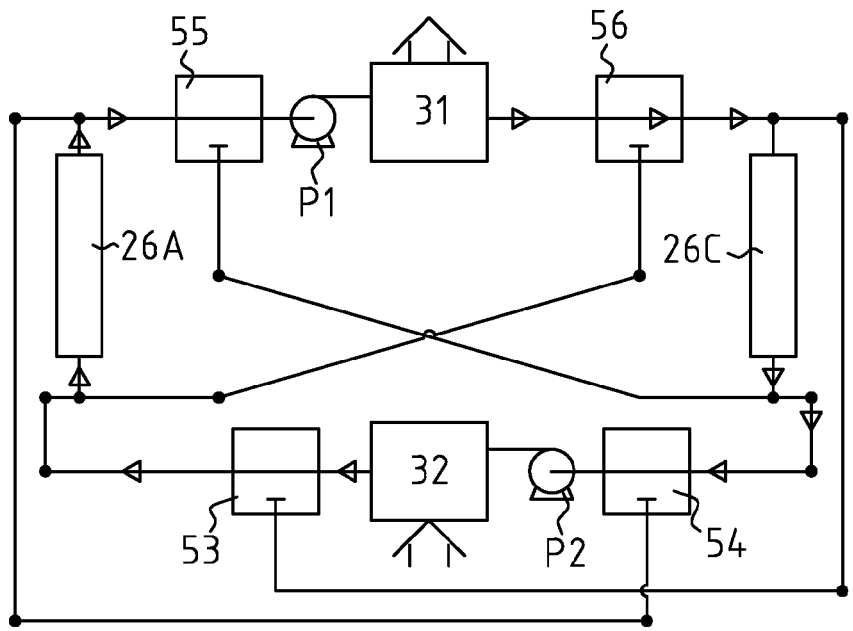

In FIG. 10A-D a first alternative with short cuts, without changing the direction of the flow in the clusters 26A-D is represented. A similar flow scheme is depicted in FIGS. 10E-10I, wherein only the arrangement of the individual elements is different, the flow lines are the same as in the FIGS. 10A-D. In FIG. 10A the first mode of the cycle is represented, in which the heat transfer fluid is pumped from heater 32 through three way valve 53 to cluster 26A, in which the adsorbing material is heated. The heat transfer fluid exiting the cluster 26A, is during the motion of the thermal wave through the cluster 26 still relatively cold and is guided through three way valve 55 to the cooler 31. Here the relative cold heat transfer fluid is additionally cooled. This cooled heat transfer fluid is guided through three way valve 56 to cluster 26C, which is in its cooling mode, thus adsorbing gas in the adsorbing material within its tubes. The heat transfer fluid exiting the cluster 26C is still relatively hot and is guided through three way valve 54 to the heater 32.

Thus cluster 26A is being heated, wherein a hot thermal wave front is moving upwards, and cluster 26C is cooled down, wherein a cold thermal wave front is moving downwards.

Figure 10B:
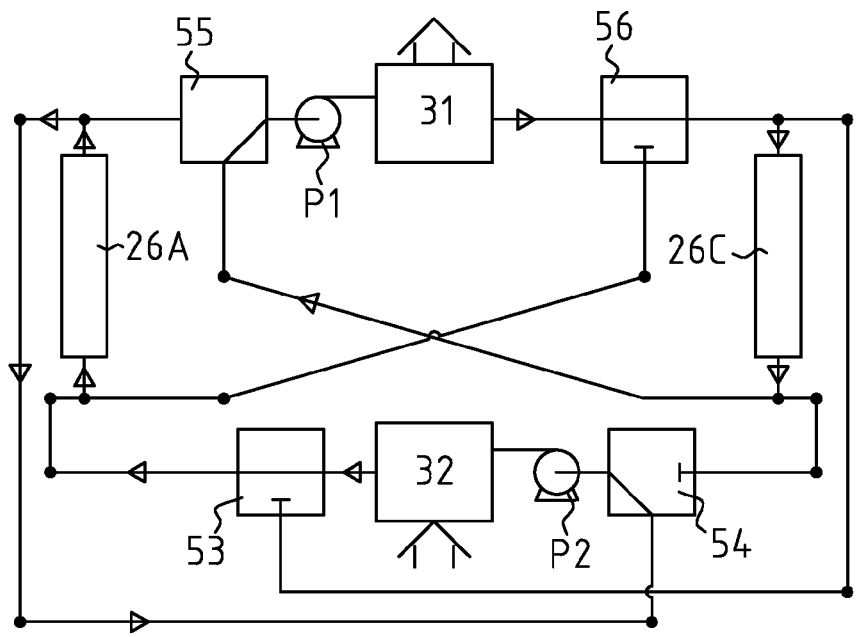

When a relative flattened (dispersed) thermal wave breaks through, at a certain moment the cycle is switched to the first shortcut mode, which is represented by FIG. 10B. The optimum moment in time of switching is described with reference to FIG. 12 herein below. During switching, the three way valves 54 and 55 are switched, resulting in that heater 32 and the cluster 26A are in a first separate cycle and cooler 31 and cluster 26C are in a second separate cycle. Thus cluster 26A is still further heated up, while its exit stream of heat transfer fluid now is guided back to heater 32 in stead of to the cooler 31. Meanwhile cluster 26C is still cooled down, while its exit stream is returned to the cooler 31 instead of to the heater 32.

At a moment the thermal wave is fully broken through and further heating of cluster 26A as well as further cooling of cluster 26C is impossible.

Figure 10C:
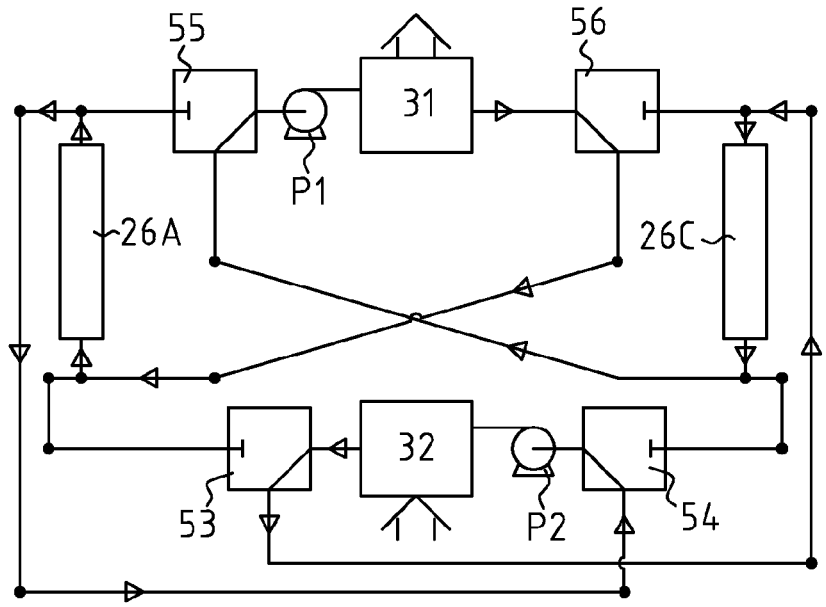

At that moment the cycle will be reversed, such that the cooled cluster 26C must be re-heated, the heated cluster 26A must be re-cooled. This can be performed by switching to the third mode of operation, as is represented in FIG. 10C.

Figure 10D:
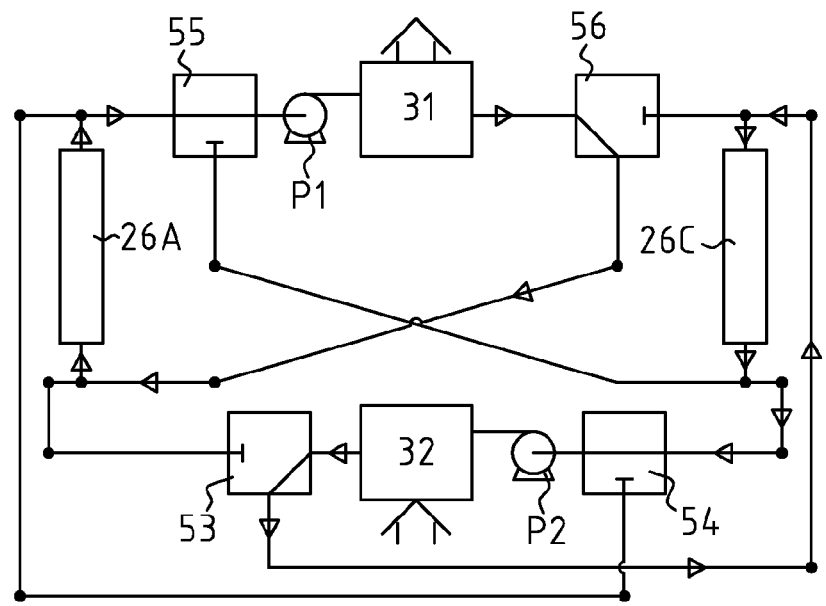
Figure 10E:
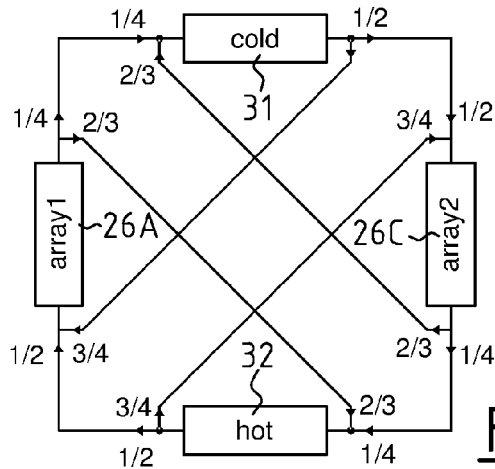
Figure 10F:
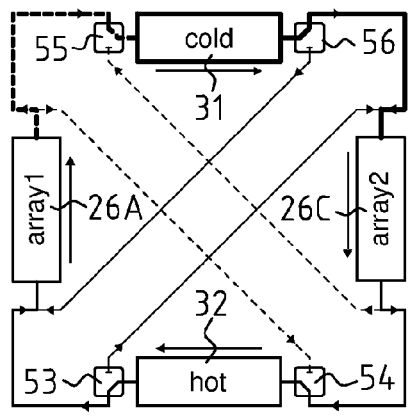
Figure 10G:
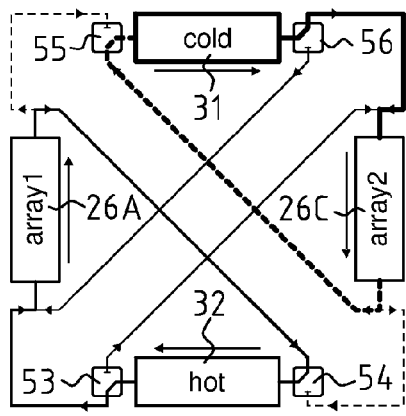
Figure 10H:
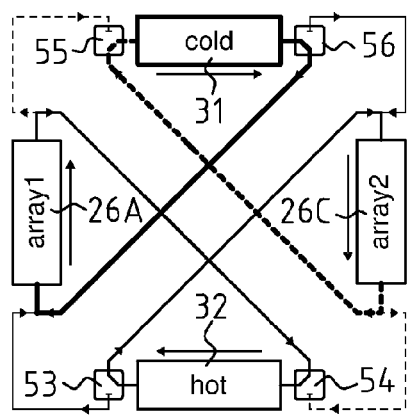
Figure 10I:
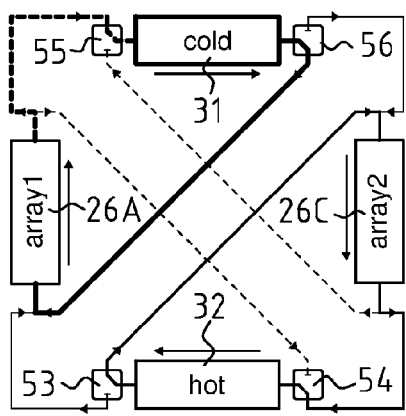

In this figure, the cluster 26A is now cooled down, and the cluster 26C is now heated up. Once the relative flattened (dispersed) thermal waves in cluster 26A and 26C break through, the cycle is switched to a second shortcut mode, as represented in FIG. 10D. In this figure, the heater 32 and the cluster 26B form a third closed cycle, while the cooler 31 and the cluster 26A form a fourth closed cycle. When the full thermal waves break through in both clusters 26A and 26C, the system is switched again to the first mode of operation.

In the FIGS. 10A-10D, both the hot and cold thermal waves all travel in one direction through the clusters 26A and 26C, whereas in he embodiment of FIGS. 7 and 8, the thermal wave is sent back and forth within the clusters 26A-D. Accordingly the clusters 26A and 26C in FIGS. 10A-D no longer have a hot and a cold side.

Indeed it is possible also to send the thermal waves back and forth within the clusters, while still recovering losses in efficiency due to flattened (dispersed) thermal waves. In FIGS. 11A-11D the schematic process flow diagram for such operation is presented. In these diagrams the clusters are at each end provided with cross connectors in stead of T connectors.

Figure 11A:
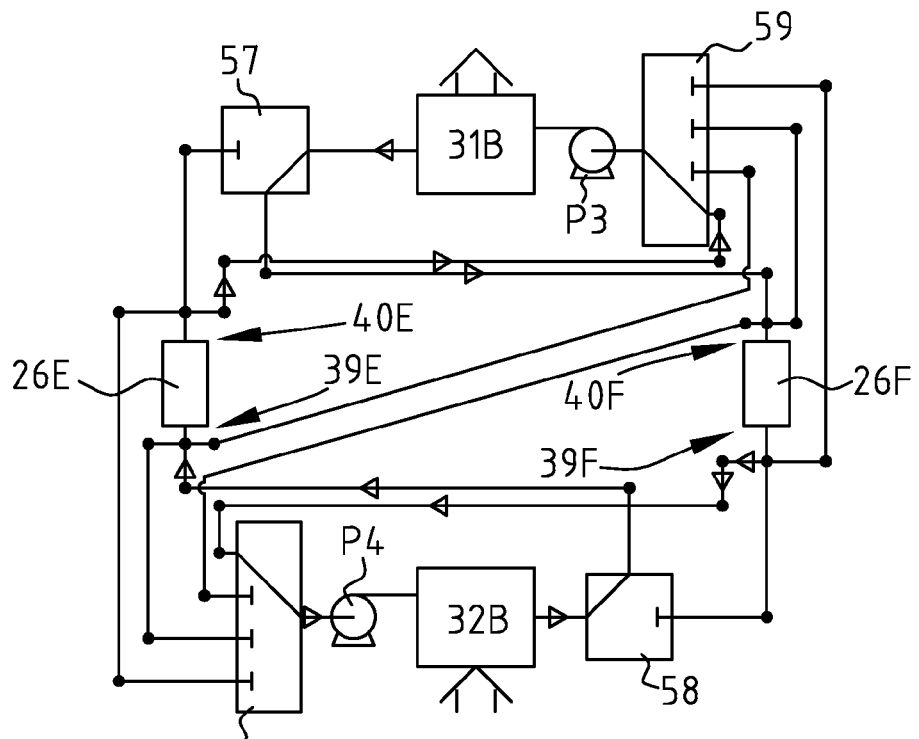
Figure 11B:
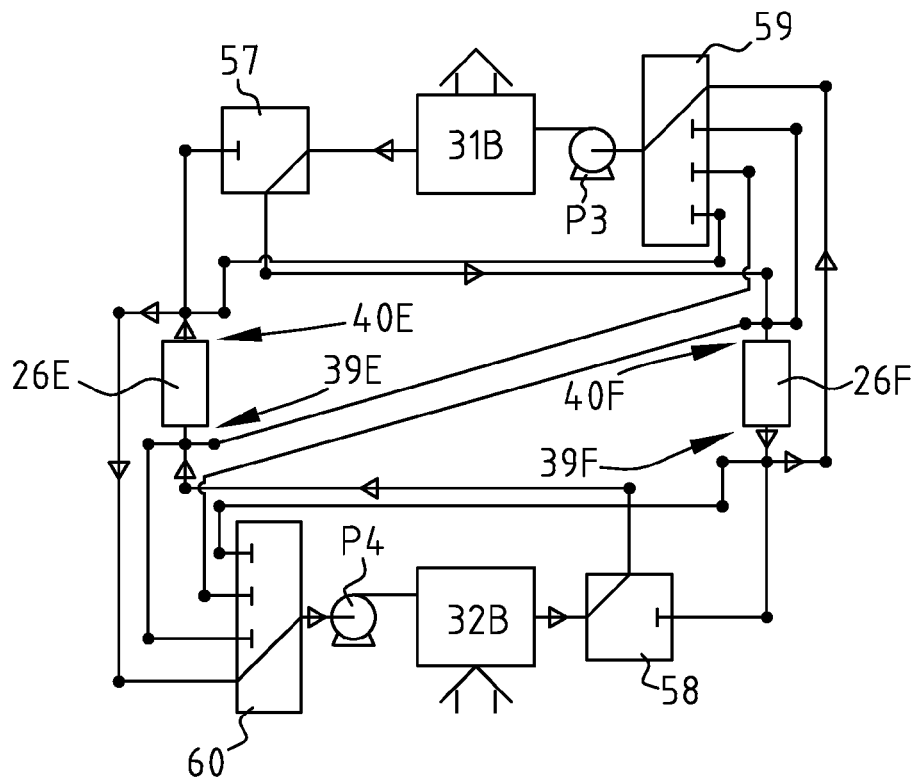

In the first mode, as represented by FIG. 11A the cluster 26E is heated, while the cluster 26F is cooled. In cluster 26E, the heat transfer fluid flows upward, in cluster 26F, the heat transfer fluid flows downward. Once the thermal waves break through, the operation is switched to the second mode. In this first mode the thermal waves that break through are in fact a hot front reaching the cold side 40E of cluster 26E and simultaneously the cold front reaching the hot end 39F of cluster 26F. In the embodiment as represented by FIGS. 7 and 8, at this moment the flow within the clusters would have been reversed. Since however the thermal wave may be more flattened (dispersed), in order to gain the performance, in the second mode, cluster 26E is further heated and cluster 26F is further cooled, however the exiting flows are diverted. In this mode, as depicted in FIG. 11B, the exiting flow of cluster 26E is led to the heater 32B instead of to the cooler 31B and meanwhile the exiting flow of cluster 26F is guided to the cooler 31B instead of to the heater 32B.

Figure 11C:
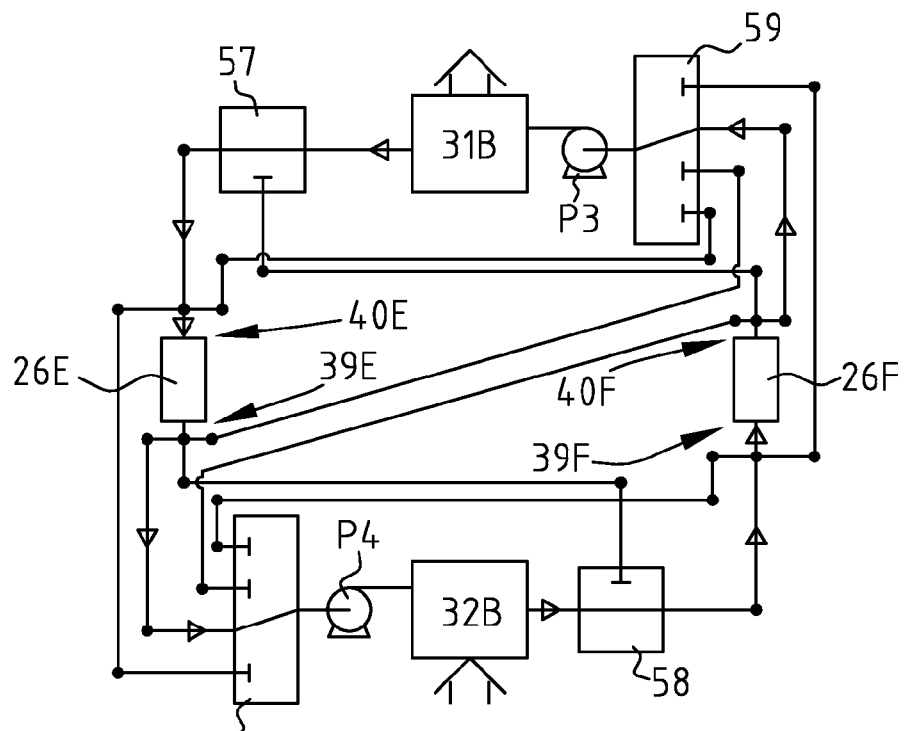
Figure 11D:
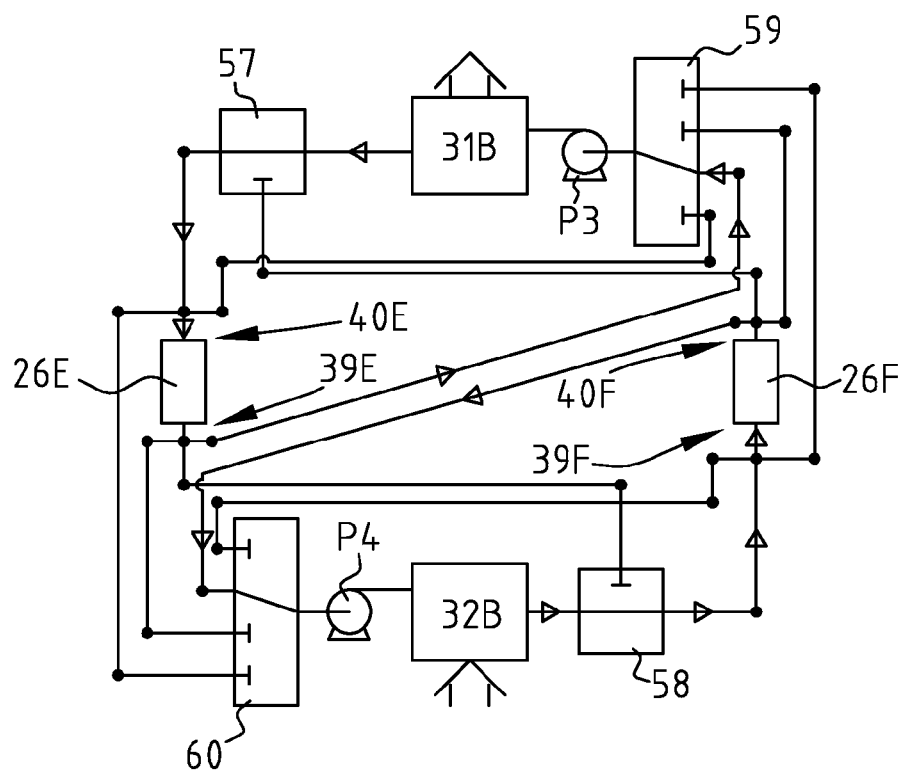

When the thermal heat wave tails break through, the direction of flow in both clusters 26E and 26F is reverted. In this mode, which is represented by FIG. 11C, cluster 26F is heated, while cluster 26E is cooled. Now the flow direction in cluster 26E is directed downward and in cluster 26F is directed upward. Once in the third mode the thermal waves start to break through in the clusters 26E and 26F, the system is switched in its fourth mode, as represented in FIG. 11D. In this mode, cluster 26E and cooler 31B are coupled in a first cycle, and cluster 26F and heater 32B are coupled in one cycle.

When the tails of the heat waves break through, the system is switched back to its first operating mode.

The arrangement of valves and manifolds is designed to only have a small portion of conduits, wherein hot and cold heat transfer fluid needs to pass. Thus within the embodiments of the systems according to the invention, no single valve is faced with hot and cold het transfer fluid streams. Thus efficiency losses can be minimized.

The determination of the right moment to switch from the first mode to the second shortcut mode of the cycle depends on maximizing the overall efficiency or the COP of the system.

It appears from validated modeling that indeed the thermal waves are rather flattened (dispersed), as is represented in FIG. 12. In this figure, the outflow temperatures of cluster 26A and 26C, as shown in FIGS. 10A-D and described hereinabove, are depicted in relation to the time the thermal wave is passing through these clusters. These exit temperatures are in theory the temperatures of the heat transfer fluid that can be used to heat or cool the other cluster. Before entering the other cluster, the temperatures of the heat transfer fluid are brought back to original levels in the cooler 31 and the heater 32. The more these temperatures deviate from the original temperature, the higher temperature difference need to be bridged and the more effort needs to be put in. In the ideal situation the heat wave is very steep and the temperature deviations are relatively small and substantially constant during the first mode.

The solid line in FIG. 12 represents the temperature at the exit of cluster 26A. Cluster 26A is at time 0 hot and in the cooling down mode and cluster 26C is cold and in the heating mode. The temperatures of cluster 26A are discussed for several time intervals:

- 0-100 s. There is a linear decrease of temperature of the out flowing fluid. Because relative cold heat transfer fluid is flowing in, the first part of the cluster 26A is cooled down rapidly. Significant adsorption occurs at that part of the adsorption bed so that the whole bed is depressurized. Because of this pressure decrease, the warm part of the adsorption bed will start to desorb. Heat of desorption is required, this lowers the temperature of the bed. Since the cell is built like a heat exchanger, the thermal fluid passing and exiting the cluster 26A will also be cooled.
- 100-550 s. The cluster 26A is at low pressure, gas flows into the adsorption material side of the cluster 26A and is adsorbed. The out-flow temperature remains substantially constant at a sort of a 'plateau' for a while, but then gradually drops at 250 s. Indeed the results in FIG. 12 indicate that the thermal gradients are not as steep as expected and described in e.g. U.S. Pat. No. 4,610,148.
- 550-1200 s. The temperature of the heat transfer fluid flowing out of cluster 26A is still lower than that of the heat transfer fluid flowing out of cluster 26C.

At 550 s, the temperature of the heat transfer fluid flowing out of cluster 26C becomes higher than that of the heat transfer fluid flowing out of cluster 26A. At that point, the system should switch from the first mode into the second shortcut mode, as represented in FIG. 10B.

At this very moment, it is less efficient to heat up the heat transfer fluid exiting cluster 26A and to use it to further heat up cluster 26C. More efficient is to cool down this heat transfer fluid and to reuse it in the very same cluster 26A to further cool this cluster 26A.

In all the operations of switching mode, as represented by FIGS. 7-11, a further efficiency gain can be obtained when the pressure in the adsorption sides of the separate cells or the separate clusters is equalised between switching from adsorption to desorption and vice versa. Such an option requires an additional short cut line 62B with a short cut valve 63B which are represented in dashed lines in FIG. 9.

From validated numerical simulations in coaxial shell and tube design, as depicted in the FIGS. 1,2 and 10A-D a relation between the COP and the SCP could be obtained, as is plotted in a graph as depicted in FIG. 13. In this figure on the abscises a combined parameter γ is plotted against the COP on the ordinate. The combined parameter γ is defined as $$\gamma = SCP \cdot \frac{r^2}{\lambda_{ads}} \quad (10)$$

Wherein ads is the thermal conductivity of the adsorbing material and r is the (equivalent) radius of the adsorbing material in an elongated tube. From this figure it can be deduced that at a high value of γ, the COP tends to a value of 0.4, which represents a compressor with batch heating and cooling, where no thermal wave is present. It can further be deduced that with a small (equivalent) radius a relative high COP can be reached, although the SCP may suffer.

The COP and the SCP are generally desired quantities, dictated by technical specifications and commercial reasons. Once these are given and the specific adsorption material is chosen, from this plot, the (equivalent) radius of the adsorption material can be deduced.

The results of this plot imply:

- The decrement in COP with increasing γ is caused by the occurrence of enlarged radial gradients at the position of the thermal wave where heat flows in or out of the adsorption material. These radial gradients are believed to reduce the steepness of the thermal wave, in effect the thermal wave becomes sort of smeared out in the elongated direction of the adsorption cell 1, causing the exit temperature to decrease earlier in a hot cell and to increase earlier in a cold cell.
- Enlarged radial gradients can be influenced by the three parameters: SCP, r and within the combined parameter γ in the following way:
  - Proportionally by the SCP since the SCP is directly related to the power input of the cell, and logically radial gradients are directly related to the power input.
  - Proportionally to the square of the (equivalent) radius of the adsorption material, the input power has to increase with the mass of the adsorption material within the cell in order to maintain the SCP constant, and the mass of the cell is proportional to the square of r.
  - Proportionally to the inverted radial thermal conductivity of the adsorption material. A higher conductive heat transport lowers the thermal gradients.

The COP is substantially not related to the length of the cell, as long as the cells remain elongated, wherein a length over diameter of at least 10 seems reasonable. Practically spoken, no difference in COP is obtained by either taking 20 cells of 1 m or 40 cells of 0.5 m. In both situations the SCP remains constant. However, the length of the cells does have a substantial effect on the power losses due to viscous pressure drop in the heat transfer fluid channel, as can be deduced from equation 9.

Accordingly a maximum COP is achieved at a minimal SCP, which is a known trade off. More interesting is that the thermal conductivity of the adsorption material should be high, less known is that it is far more important to reduce the (equivalent) radius of adsorption material. In this equation 10 minimising the (equivalent) radius of the adsorption material appears to have the highest impact on γ.

However a smaller (equivalent) radius of the adsorption material results in a larger number of cells. The number of cells can be calculated with:

$$N = \frac{P_{cooling}}{SCP \cdot \rho_{ads} \cdot \pi \cdot \gamma^2 \cdot l_{cell}} = \frac{P_{cooling}}{\gamma \cdot \lambda_{ads} \cdot \pi \cdot \rho_{ads} \cdot l_{cell}} \quad (11)$$

With this (equivalent) radius, and equation 4 a maximum diameter of the heat transfer fluid channel can be determined. In addition thereto, from the equation 9, a maximum pressure drop can be deduced. The pressure drop and the Biot number can now be plotted against the thickness of the heat transfer fluid channel, as is represented in FIG. 14.

In this figure the pressure drop is scaled at the right ordinate, the Biot number is scaled at the left ordinate, the diameter of the annular heat transfer fluid channel is scaled at the abscises. Line L1 represents the calculated pressure drop, line L2 represents the calculated Biot number. From this plot, it can be deduced weather a diameter is given for which on the one end the power losses due to hydrodynamic pressure drop is not too high and on the other hand the Biot number is not too low.

This plot depicts that for the combination of amorphous carbon as adsorbents, $NH_3$ as refrigerant or adsorbing gas and water as a heat transfer fluid, in a concentric tube design, a working window is provided. This window allows the diameter of the heat transfer fluid channel to be between approximately 0.1 and 0.4 mm.

In case thermal oils are used as heat transfer fluid, due to the relative low thermal conductivities, Biot requires an extremely narrow heat transfer fluid channel, leading to unacceptable pressure drop. In order to still provide a working range, radial heat conductors can be inserted within the heat transfer channel.

The thermal conductivity of the heat transfer fluid can be chosen between approximately 0.1 and 10 W/mK, wherein for possible fluids, like mercury, the thermal conductivity is approximately 7-10 W/Km, and of water is approximately 0.3-1.0 W/Km. Thermal oils can have thermal conductivity of 0.1-0.6 W/Km. Accordingly workable ranges may be between 0.1 and 10 W/Km, however predominantly may lie between 0.1 and 1 W/km.

For the cycle time the following equation is given:

$$t_{cycle} = \frac{\Delta x_{net} \cdot \Delta h}{SCP} \quad (12)$$

Wherein $t_{cycle}$ is the total cycle time of a sorption cell or cluster i.e. the total cycle time for the ad- and desorption mode, h is the enthalpy change [J/g] of the refrigerant gas that is providing the cooling power (typically 1.2 MJ/kg for ammonia) and $x_{net}$ is the net amount of gas that is ad- and desorbed from the carbon in one ad- and desorption cycle, expressed in gram gas per gram adsorption material (typically 0.15 gram ammonia per gram carbon).

In FIG. 15, an example of such radial conductors is presented. In this figure a corrugated thin metal sheet 61 is attached around the inner wall 12 of the adsorption material 10.

In FIG. 16 a further alternative geometry of the adsorption material 10, the inner wall 12 and the outer wall 11 is presented. In this embodiment, a series of tubes containing adsorption material are jacketed by an outer wall 11. In between the separate adjacent tubes, the outer wall can be welded or soldered together. An advantage of this arrangement is that higher capacity coolers or heat pumps need a substantial amount of adsorption material, which can be more rapidly manufactured when a number of channels are connected and produced in one step.

Alternatively, as is depicted in FIG. 17, also virtual three dimensional structures can be made, where the heat transfer fluid channels are virtually surrounded by adsorption material. Infinitive shapes of such three dimensional structure are possible, though the diameter of the heat transfer fluid channel should substantially not vary within the cluster, neither in the elongated direction nor in its cross sectional direction, since "false flows" might rapidly impair the efficiency of the adsorption compressor. Indeed in these geometries the relative dimensions of the heat transfer fluid channels and the dimensions of the adsorption material must still obey equation 4 or its geometrical equivalent.

In order to improve the radial conductivity of the adsorption material, e.g. radial conductors can be inserted in the adsorption material. For instance heat conductive lamellae 62A might be arranged within the adsorption material 10, in between individual adsorption units 68B, which are typically cylindrical in shape, for instance in the form of pills, as is depicted in FIG. 18A. Other solutions might be to integrate heat conductive carbon fibres within the amorphous carbon. These carbon fibres might include carbon nanofibres such as bucky tubes.

In another embodiment, the adsorption cell or cluster thereof of the invention comprises units (68B) and conductive lamellae (62A) that are formed by a pill that is at least partly surrounded by a cup from a heat conductive material, wherein the cup contains the pill. The closely fitting cups are preferably made of the same material as the cell wall, typically stainless steel, to minimize the effects of thermal expansion mismatch between the cell and the cups. A separate thin sheet of high-conductive material (such as aluminum or graphite) can be added on one or both sides of the bottom of the cup to ensure a good heat transfer from the cell wall into the adsorption pills. This embodiment is schematically illustrated in FIG. 35.

It is also possible to provide the cup (111) entirely of the conductive material, such as aluminum.

The cup may contain one or more openings (70) that serve as a channel for the refrigerant.

Alternative adsorbent materials that may be applied within the scope of the invention are activated carbons, zeolites, silica gels and metal organic frameworks. The refrigerants that alternatively may be applied are carbon dioxide, hydroflorocarbons, (HFC's such as R-134a refrigerant), hydrochlorofluorocarbons (HCFC's such as R-123 refrigerant), water, methanol, ethanol, ethane, propane, isobutene, isopentane, propylene, formaldehyde and vinyl fluoride. Other suitable refrigerants may also be applied within the scope of the invention.

In FIG. 18B the individual adsorption pills 68B are provided with radial micro channels 69 in order to enhance the permeability of the adsorption material. In the case the permeability of the adsorption material becomes to low, these channels may prevent the radial transport of the refrigerant gas or vapor as becoming a limiting factor in the efficiency of the adsorption compressor. The micro channels can support the transport of refrigerant to and from the refrigerant channel 70.

During manufacture of the adsorption pills 68B, the shape of the radial micro channels 69 may already be present in the adsorption pill press mould, such that no machining of the adsorption pills need to be performed afterwards. Alternatively, these micro channels 69 may be machined or etched into the adsorption material. These micro channels 69 may be applied at one or at both facing ends of the individual pills 68B.

In FIG. 19 a buffer container comprising adsorption material 10 is integrated in the refrigerant loop of FIG. 9. The amount of refrigerant in the loop can be adjusted by adjusting the temperature of the buffer container 63A. For this a temperature controller 65 can regulate a valve 68A in order to maintain the temperature at a predetermined value. By adjusting the amount of refrigerant inside the loop, the pressure in the condenser 46 and the evaporator 49 can be changed, thus changing the boiling and condensation temperature. Thus an elegant way of setting these temperatures can be obtained. Adjusting the expansion valve 48 can also be performed in order to adjust the relative pressures and temperatures in both the evaporator 49 and the condenser 46.

In FIGS. 20-23B an alternative adsorption cell cluster 26 is depicted. In this adsorption cell cluster 26 a matrix of 10×10 parallel adsorption cells 1 is arranged in between two distribution elements 71 and 72. The distribution elements 71 and 72 comprise a set of three plates 75, 76 and 77.

The first plate, the refrigerant conduit plate 75 comprises a refrigerant gas opening 73 for connecting a refrigerant manifold 78 to a refrigerant conduit 22, 25 leading to the refrigerant loop as represented e.g. in FIG. 9 or 19. The refrigerant manifold 78 is machined or etched out of the material of the refrigerant conduit plate 75. The refrigerant manifold 78 is in fluid connection with ten refrigerant sub manifolds 79. The sub manifolds 79 are separated from each other by separation ribs 81. In the sub manifolds 79 refrigerant guiding stubs are arranged for guiding the refrigerant in and out the inner tube 12 of the adsorption cells 1.

The manifold 78 and the sub manifolds 79 are closed of by a lower side of the heat transfer conduit plate 76. The top side of the heat transfer conduit plate 76 comprises a heat transfer fluid manifold 82, which can be connected via heat transfer fluid opening 74 to a heat transfer fluid T-connector 16. The manifold 82 is in fluid connection with ten heat transfer fluid sub connectors 83. These sub manifolds 83 are in fluid connection with the annular heat transfer fluid channels 2A of the individual adsorption cells 1.

The manifold 82 and the sub manifolds 83 are closed by closing plate 77. The closing plate 77 comprises openings for connecting the outer cylindrical wall 11 to the closing plate 77.

The plates 75, 76 and 77 can be interconnected by means of gluing, soldering of welding. The outer 11 and inner 12 cylindrical walls of the individual adsorption cells can similarly be welded, glues and/or soldered to the plates 77 and 76 respectively.

In the schematic cut out view of FIG. 23B, the arrangement of the three plates is depicted in more detail. In this figure, the outer cylindrical walls 11 of the individual adsorption cells 1 are connected to the openings in closing plate 77. The ends of the outer cylindrical walls 11 are substantially flush with the inner face of the closing plate 77. The inner cylindrical walls 12 extend further and are connected in the connecting openings 85A of the heat transfer fluid conduit plate 76. Thus a fluid connection can be obtained between the heat transfer fluid sub manifolds 83 and the annular heat transfer fluid channel 2A.

The ends of the inner cylindrical wall 12 of the individual adsorption cells are connected with the heat transfer conduit plate 76. The ends of the inner cylindrical walls 12 are substantially flush with the upper face of the heat transfer fluid conduit plate. Thus a fluid connection can be obtained between the refrigerant sub manifolds 79 and the adsorption material 10.

In FIG. 24, an alternative arrangement of the distribution elements of the clusters is depicted. Separate plates 91, 93, 94 and gasket 92 are held together by a set of bolts 90. In this arrangement, a closing plate 91 is provided with a series of reinforcement ribs 89 and reinforcement rings 95. These ribs 89 and rings 95 provide structural integrity to the closing plate 91 and give it the strength to withstand the pressures of the refrigerant gas. Through the reinforcement rings 95 of the closing plate, the bolt bores 97 in gasket 92, bolt bores 103 in the twin conduits plate 93 and the bolt bores 104 in the closing plate 94 bolts can be placed.

The twin conduit plate 93 is at its upper side provided with a refrigerant manifold 100 and at it lower side with a heat transfer fluid manifold 106. These manifolds 100 and 106 can be machined out of the material of the twin conduits plate 93 or may alternatively be etched in the material. In the refrigerant manifold 100 considerable pressure might be present, up to approximately 20 bar. In order to contain the refrigerant inside the manifold and the system, a gasket can be placed between the twin conduits plate 93 and the closing plate 91.

Although in the embodiment shown in FIGS. 26A-D, a single manifold for both the heat transfer fluid and the refrigerant is depicted, alternatively also the arrangement with one manifold and separate sub manifolds can be applied, as is performed in the embodiments shown in FIGS. 22A-C.

Alternatively a second gasket may be applied in between the twin conduits manifold and the closing plate 94, in order to contain the heat transfer fluid.

In FIGS. 27A and 27B, a detailed cut open view is depicted of the cluster according to FIG. 24. In this arrangement the heat transfer fluid channels 2A of the individual adsorption cells are in fluid connection with the heat transfer fluid manifold 106, and the adsorption material 10 is in fluid connection with the refrigerant header 100.

The refrigerant header 100 is connected to the refrigerant conduit 86 which can be in fluid connection with the refrigerant loop as represented in FIG. 9 or 19. The heat transfer header 106 is in fluid contact with the heat transfer conduit 87, which is connected to the stem of a T-connector 88.

Thus these clusters 26 can be integrated in the schematic flow diagrams as depicted in FIGS. 7-9, 10A-I, replacing the clusters 26A-D.

The cluster 26 can similarly be integrated in the process flow diagram according to FIG. 11A-D, however in that case, the T-connectors 88 need to be replaced with cross connectors in order to fit in. In order to provide simultaneously moving thermal waves within one cluster, the predominant flow resistance should remain within the heat transfer channels 2A. This means that the heat transfer fluid manifolds 82, 106 need to be designed such that their flow resistance is at least an order of magnitude less than the overall flow resistance of all heat transfer fluid channels 2A of all the cells within one cluster.

The refrigerant connections of the clusters can be at one or at two sides as is explained hereinabove.

The T-connectors in the heat transfer fluid conduits may be replaced by two heat transfer exits of manifolds 82, 106 at each end of the cluster.

The plates 75-77, 91-95 can be glued together, welded, soldered and/or a combination thereof. The cylindrical walls can be glued, shrink fitted, welded, soldered or screwed in or onto the plates.

Although the matrix of adsorption cells 1 is presented as a squared matrix, alternative arrangements are similarly possible, such as a honeycomb type of arrangement.

The present invention can be applied in a large variety of fields, in particular when waste heat is available, ranging from air conditioners, such as in automotive applications, in particular trucks; to refrigerators and other applications.

EXAMPLE

Figure 6B:
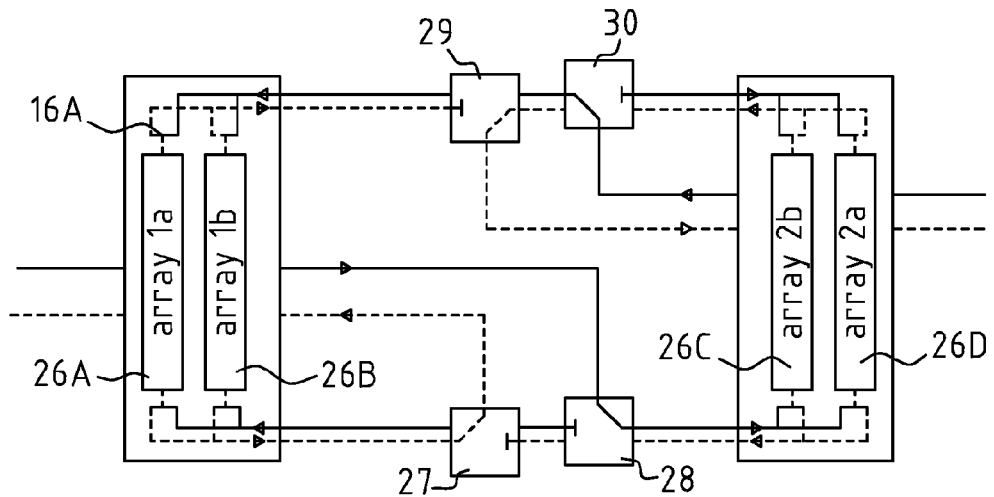
FIG. 6B shows a schematic flow diagram of two arrangements of adsorption cell clusters shown in FIG. 6A.

An experimental set-up was built to verify the performance improvements resulting from the present invention method of operation of the thermal wave, in combination with the described adsorption compressor bed suitable for thermal wave operation. The set-up consists of the following system components:

Two adsorption compressor beds, each made up of two clusters of eight adsorption cells as depicted in FIG. 6B.

A HTF system with heater, cooler and four three-way valves, connected as depicted in FIG. 10, which can be switched according to FIG. 10F-10I.

A refrigerant loop incorporating check valves, condenser, evaporator and flow restriction as depicted in FIG. 9.

A control system suitable to adjust the three-way valves, and to measure the relevant temperatures, pressures, flows and powers.

With this experimental set-up the claimed method of operation of the thermal wave was clearly demonstrated, and the expected heat pump operation was verified, resulting in an improved COP in combination with a high SCP. FIG. 36 demonstrates a typical measurement of the resulting entrance (112, 114) and exit (113, 115) temperatures of the two adsorption beds as a function of time. The depicted area X is proportional to the amount of heat that is regenerated between the two beds in this cycle. Note that in this particular measurement a temperature difference remains at the end of the cycle, which is the result of poor thermal isolation of the compressor beds in this experimental set-up.

The invention is to be understood not to be limited to the exemplary embodiments shown in the figures and described in the specification. Various modifications are considered to be variations that are part of the framework, the spirit and the scope of the invention outlined in the claims.

| Reference sign list | |
|---|---|
| 1 | Adsorption cell |
| 2A | Annular heat transfer fluid channel |
| 2 | Heat transfer fluid connector |
| 3 | Heat transfer fluid connector |
| 4 | Vapor connector |
| 5 | Cap |
| 6 | Conduit connector |
| 7 | Skirt |
| 8 | Inner cap |
| 9 | Inner cap connecting portion |
| 10 | Adsorption material |
| 11 | Outer cylindrical wall |
| 12 | Inner cylindrical wall |
| 13 | Distribution connector |
| 14 | Connecting opening |
| 15 | Header connector |
| 16 | Heat transfer fluid T-connector |
| 17 | Vapor conduit connector |
| 18 | Vapor header manifold |
| 19 | Vapor header connector |
| 20 | Heat transfer fluid inlet header |
| 20a-d | Heat transfer fluid inlet manifolds |
| 21a-d | Heat transfer fluid outlet manifolds |
| 21 | Heat transfer fluid outlet header |
| 22 | Vapor conduit |
| 23 | Vapor conduit |
| 24 | Vapor manifold T-connector |
| 25 | Vapor manifold |
| 26a-d | Adsorption cell cluster |
| 27 | Hot heat transfer fluid three-way inlet valve |
| 28 | Hot heat transfer fluid three-way outlet valve |
| 29 | Cold heat transfer fluid three-way outlet |
| 30 | Cold heat transfer fluid three-way inlet valve |
| 31 | Cooler/Heat exchanger |
| 32 | Heater/Heat exchanger |
| 33 | Cold heat transfer fluid inlet conduit |
| 34 | Hot heat transfer fluid outlet conduit |
| 35 | Cold heat transfer fluid outlet conduit |
| 36 | Hot heat transfer fluid inlet conduit |
| 37 | Pump |
| 38 | Pump |
| 39A-F | Hot sides |
| 40A-F | Cold sides |
| 41A-B | Check valves |
| 42A-B | Check valves |
| 43 | High pressure gas conduit |
| 44 | High pressure gas conduit |
| 45 | High pressure gas manifold |
| 46 | Condenser |
| 47 | Expansion conduit |
| 48 | Expansion valve |
| 49 | Evaporator |
| 50 | Low pressure gas manifold |
| 51 | Low pressure gas conduit |
| 52 | Low pressure gas conduit |
| 53 | Three way valve |
| 54 | Three way valve |
| 55 | Three way valve |
| 56 | Three way valve |
| 57 | Three way valve |
| 58 | Three way valve |
| 59 | Manifold |
| 60 | Manifold |
| 61 | Corrugated sheet |
| 62A | Lamellae |
| 62B | Equalising conduit |
| 63A | Buffer container |
| 63B | Equalising valve |
| 64 | Heater |
| 65 | Temperature controller |
| 66 | Buffer conduit |
| 67 | Valve |
| 68A | Control valve |
| 68B | Adsorption pill |
| 69 | Radial micro channel |
| 70 | refrigerant gas channel |
| 71 | Distribution element |
| 72 | Distribution element |
| 73 | Refrigerant gas opening |
| 74 | Heat transfer fluid opening |
| 75 | Refrigerant conduit plate |
| 76 | Heat transfer conduit plate |
| 77 | Closing plate |
| 78 | Refrigerant manifold |
| 79 | Refrigerant sub manifold |

-continued

| | Reference sign list |
|---|---|
| 80 | Adsorption material retainer stub |
| 81 | Separation rib |
| 82 | Heat transfer fluid manifold |
| 83 | Heat transfer fluid sub manifold |
| 84 | Separation rib |
| 85A | Inner tube connecting opening |
| 85B | Distribution element |
| 86 | refrigerant conduit |
| 87 | Heat transfer fluid conduit |
| 88 | T-connector |
| 89 | Reinforcement rib |
| 90 | Bolt |
| 91 | Closing plate |
| 92 | Gasket |
| 93 | Twin conduits plate |
| 94 | Closing plate |
| 95 | Reinforcement ring |
| 96 | Bolt bore |
| 97 | Bolt bore |
| 98 | Rib |
| 99 | Edge |
| 100 | Refrigerant manifold |
| 101 | Spacer ring |
| 102 | Inner tube connecting opening |
| 103 | Bolt bore |
| 104 | Bolt bore |
| 105 | Outer tube connecting opening |
| 106 | Heat transfer fluid manifold |
| L1 | Line, representing Biot number |
| L2 | Line, representing pressure drop |
| P1-P4 | Pumps |
| 107A-H | Two-way valve |
| 108A-B | Four-way valve |
| 109 | Heat transfer fluid channel |
| 110A-B | Corrugated plate |
| 111 | Cup |
| 112 | Bed 1 inlet temperature |
| 113 | Bed 1 outlet temperature |
| 114 | Bed 2 inlet temperature |
| 115 | Bed 2 outlet temperature |

The invention claimed is:

1. A method of operating an adsorption compressor system including:
   at least one elongate first adsorption bed,
   at least one elongate second adsorption bed,
   a refrigerant circuit including an evaporator and a condenser, wherein the first adsorption bed and the second adsorption bed are part of the refrigerant circuit,
   a heat transfer fluid circuit that is separate from the refrigerant circuit and that includes:
      a hot source,
      a cold source,
      at least an elongate first heat transfer fluid channel that extends along the first adsorption bed and is in direct heat transferring contact with the first adsorption bed,
      at least an elongate second heat transfer fluid channel that extends along the second adsorption bed and is in direct heat transferring contact with the second adsorption bed, and
      heat transfer fluid control valves for controlling the direction of a flow of heat transfer fluid through the hot source, the cold source, the first heat transfer fluid channel and the second heat transfer fluid channel of the heat transfer fluid circuit,
   wherein, starting from a situation in which the first adsorption bed has an initial temperature that is lower than an initial temperature of the second adsorption bed, the method comprises the following phases A, B, C and D which are subsequently executed:

Phase A comprising:
   controlling the heat transfer control valves to direct the heat transfer fluid subsequently through the second heat transfer fluid channel, the hot source and the first heat transfer fluid channel, the cold source and back to the second heat transfer fluid channel to heat the first adsorption bed by means of a thermal wave in the first adsorption bed and to cool the second adsorption bed by means of a thermal wave in the second adsorption bed; and
   maintaining Phase A until an exit temperature of the heat transfer fluid effluent leaving the first heat transfer channel and an exit temperature of the heat transfer fluid effluent leaving the second heat transfer channel are essentially the same;

Phase B comprising:
   controlling the heat transfer fluid control valves to direct a first flow of heat transfer fluid subsequently through the first heat transfer fluid channel, the hot source and back into the first heat transfer fluid channel to further heat the first adsorption bed, and to direct a second flow of heat transfer fluid subsequently through the second heat transfer fluid channel, the cold source and back into the second heat transfer fluid channel for further cooling the second adsorption bed; and
   maintaining Phase B until a temperature in the first adsorption bed is essentially homogeneous and a temperature in the second adsorption bed is also essentially homogeneous and lower than the temperature of the first adsorption bed, Phase C comprising:
   controlling the heat transfer control valves to direct the heat transfer fluid subsequently through the first heat transfer fluid channel, the hot source and the second heat transfer fluid channel, the cold source and back to the first heat transfer fluid channel to cool the first adsorption bed by means of a thermal wave in the first adsorption bed and to heat the second adsorption bed by means of a thermal wave in the second adsorption bed; and
   maintaining Phase C until an exit temperature of the heat transfer fluid effluent leaving the first heat transfer channel and an exit temperature of the heat transfer fluid effluent leaving the second heat transfer channel are essentially the same; and Phase D comprising:
   controlling the heat transfer fluid control valves to direct a first flow of heat transfer fluid subsequently through the first heat transfer fluid channel, the cold source and back into the first heat transfer fluid channel to further cool the first adsorption bed, and to direct a second flow of heat transfer fluid subsequently through the second heat transfer fluid channel, the hot source and back into the second heat transfer fluid channel to further heat the second adsorption bed; and
   maintaining Phase D until a temperature in the first adsorption bed is essentially homogeneous and a temperature in the second adsorption bed is also essentially homogeneous and higher than the temperature of the first adsorption bed, the method further comprising:

keeping a direction of flow of the heat transfer fluid through the first heat transfer channel and the second heat transfer channel the same in phases A and C.

2. The method according to claim 1, including:
keeping the direction of flow through the first heat transfer channel and through the second heat transfer channel the same in phases A, B, C and D.

3. An adsorption compressor system comprising:
at least one elongate first adsorption bed,
at least one elongate second adsorption bed,
a refrigerant circuit including an evaporator and a condenser, wherein the first adsorption bed and the second adsorption bed are part of the refrigerant circuit,
a heat transfer fluid circuit that is separate from the refrigerant circuit and that includes:
    a heater forming hot source,
    a cooler forming cold source,
    at least an elongate first heat transfer fluid channel that extends along the first adsorption bed and is in direct heat transferring contact with the first adsorption bed,
    at least an elongate second heat transfer fluid channel that extends along the second adsorption bed and is in direct heat transferring contact with the second adsorption bed, and
    heat transfer fluid control valves for controlling the direction of a flow of heat transfer fluid through the hot source, the cold source, the first heat transfer fluid channel and the second heat transfer fluid channel of the heat transfer fluid circuit, and
a controller for controlling the heat transfer fluid control valves and that is configured to subsequently execute phases A, B, C and D:
Phase A comprising:
    controlling the heat transfer control valves to direct the heat transfer fluid subsequently through the second heat transfer fluid channel, the hot source and the first heat transfer fluid channel, the cold source and back to the second heat transfer fluid channel to heat the first adsorption bed by means of a thermal wave in the first adsorption bed and to cool the second adsorption bed by means of a thermal wave in the second adsorption bed,
    maintaining Phase A until an exit temperature of the heat transfer fluid effluent leaving the first heat transfer channel and an exit temperature of the heat transfer fluid effluent leaving the second heat transfer channel are essentially the same;
Phase B comprising:
    controlling the heat transfer fluid control valves to direct a first flow of heat transfer fluid subsequently through the first heat transfer fluid channel, the hot source and back into the first heat transfer fluid channel to further heat the first adsorption bed, and to direct a second flow of heat transfer fluid subsequently through the second heat transfer fluid channel, the cold source and back into the second heat transfer fluid channel for further cooling the second adsorption bed;
    maintaining Phase B until a temperature in the first adsorption bed is essentially homogeneous and a temperature in the second adsorption bed is also essentially homogeneous and lower than the temperature of the first adsorption bed,
Phase C comprising:
    controlling the heat transfer control valves to direct the heat transfer fluid subsequently through the first heat transfer fluid channel, the hot source and the second heat transfer fluid channel, the cold source and back to the first heat transfer fluid channel to cool the first adsorption bed by means of a thermal wave in the first adsorption bed and to heat the second adsorption bed by means of a thermal wave in the second adsorption bed,
    maintaining Phase C until an exit temperature of the heat transfer fluid effluent leaving the first heat transfer channel and an exit temperature of the heat transfer fluid effluent leaving the second heat transfer channel are essentially the same; and
Phase D comprising:
    controlling the heat transfer fluid control valves to direct a first flow of heat transfer fluid subsequently through the first heat transfer fluid channel, the cold source and back into the first heat transfer fluid channel to further cool the first adsorption bed, and to direct a second flow of heat transfer fluid subsequently through the second heat transfer fluid channel, the hot source and back into the second heat transfer fluid channel to further heat the second adsorption bed;
    maintaining Phase D until a temperature in the d first adsorption bed is essentially homogeneous and a temperature in the second adsorption bed is also essentially homogeneous and higher than the temperature of the first adsorption bed,
wherein a direction of flow of the heat transfer fluid through the first heat transfer channel and the second heat transfer channel is the same in phases A and C.

4. The adsorption compressor according to claim 3, further including:
heat transfer fluid distribution connectors or heat transfer fluid headers provided at a first side and a second side of each of the first heat transfer fluid channel and the second heat transfer fluid channel,
wherein the heat transfer fluid distribution connectors or the heat transfer fluid headers are each provided with a T-connector or two separate connectors,
wherein the heat transfer fluid control valves include a first pair of three way valves and a second pair of three way valves,
wherein each arm of the T-connectors or two separate connectors of the first side of each of the first heat transfer fluid channel and the second heat transfer fluid channel are in fluid connection with a switching side of a different three way valve of the first pair of three way valves, and
wherein each arm of the T-connectors or the two separate connectors of the second side of each of the first heat transfer fluid channel and the second heat transfer fluid channel are in fluid connection with a switching side of a different three way valve of the second pair of three way valves.

5. The adsorption compressor according to claim 4, wherein a base side of the first three way valve of the first pair of three way valves and a base side of a first three way valve of the second pair of three way valves are in fluid connection with the heater and wherein a base side of the second three way valve of the first pair of three way valves and a base side of a second three way valve of the second pair of three way valves are in fluid connection with the cooler.

* * * * *